(12) United States Patent
Evans et al.

(10) Patent No.: US 9,976,290 B2
(45) Date of Patent: May 22, 2018

(54) ELECTRONIC PLUMBING FIXTURE FITTING WITH FLOW MODULE

(71) Applicant: Moen Incorporated, North Olmsted, OH (US)

(72) Inventors: Kenneth E. Evans, Westlake, OH (US); Sanjeev S. Moghe, Chagrin Falls, OH (US)

(73) Assignee: Moen Incorporated, North Olmsted, OH (US)

( * ) Notice: Subject to any disclaimer, the term of this patent is extended or adjusted under 35 U.S.C. 154(b) by 0 days. days.

(21) Appl. No.: 15/001,143

(22) Filed: Jan. 19, 2016

(65) Prior Publication Data

US 2016/0208465 A1 Jul. 21, 2016

Related U.S. Application Data

(60) Provisional application No. 62/105,175, filed on Jan. 19, 2015.

(51) Int. Cl.
*E03C 1/04* (2006.01)
*F16K 11/00* (2006.01)
*E03C 1/05* (2006.01)

(52) U.S. Cl.
CPC ............ *E03C 1/0404* (2013.01); *E03C 1/057* (2013.01); *F16K 19/006* (2013.01); *E03C 2001/0415* (2013.01)

(58) Field of Classification Search
CPC .............................. E03C 1/0404; E03C 1/057
USPC ..................................................... 4/676–678
See application file for complete search history.

(56) References Cited

U.S. PATENT DOCUMENTS

| | | | |
|---|---|---|---|
| 4,638,832 A | 1/1987 | Mokveld | |
| 4,784,303 A | 11/1988 | Ahad et al. | |
| 4,884,725 A * | 12/1989 | Ahad | E03C 1/05 137/624.11 |
| 4,886,207 A | 12/1989 | Lee et al. | |
| 4,914,758 A | 4/1990 | Shaw | |
| 5,095,945 A | 3/1992 | Jensen | |
| 5,412,816 A | 5/1995 | Paterson et al. | |
| 5,915,417 A | 6/1999 | Diaz et al. | |
| 6,874,512 B2 | 4/2005 | Publ et al. | |
| 6,955,333 B2 | 10/2005 | Patterson et al. | |
| 7,156,267 B2 | 1/2007 | Langa | |
| 7,228,874 B2 | 6/2007 | Bolderheij et al. | |
| 7,740,711 B2 | 6/2010 | Porter et al. | |
| RE42,005 E | 12/2010 | Jost et al. | |
| 7,997,301 B2 | 8/2011 | Marty et al. | |
| 8,496,025 B2 | 7/2013 | Parsons et al. | |
| 9,010,377 B1 | 4/2015 | O'Brien et al. | |

(Continued)

FOREIGN PATENT DOCUMENTS

WO 9939978 8/1999

OTHER PUBLICATIONS

International Search Report for International App. No. PCT/US2016/013962 dated Jul. 12, 2016 (4 pages).

(Continued)

*Primary Examiner* — Huyen Le
(74) *Attorney, Agent, or Firm* — Calfee, Halter & Griswold LLP

(57) ABSTRACT

The present invention provides an electronic plumbing fixture fitting with a flow module, such as an electronic faucet with a flow module.

20 Claims, 38 Drawing Sheets

(56) References Cited

U.S. PATENT DOCUMENTS

| | | | |
|---|---|---|---|
| 9,194,110 B2 | 11/2015 | Frick et al. | |
| 9,212,473 B2 | 12/2015 | Baker et al. | |
| 9,758,951 B2 | 9/2017 | Evans et al. | |
| 9,828,751 B2 | 11/2017 | Parikh et al. | |
| 2010/0108165 A1 | 5/2010 | Rodenbeck et al. | |
| 2013/0248033 A1 | 9/2013 | Parikh et al. | |
| 2014/0021384 A1 | 1/2014 | Kabel et al. | |
| 2014/0359935 A1* | 12/2014 | Veros | E03C 1/055 4/677 |
| 2015/0292187 A1* | 10/2015 | Tseng | E03C 1/055 4/677 |
| 2015/0354185 A1* | 12/2015 | Tseng | E03C 1/0404 4/678 |
| 2016/0076233 A1 | 3/2016 | Parikh et al. | |

OTHER PUBLICATIONS

Written Opinion of the International Searching Authority for International App. No. PCT/US2016/013962 dated Jul. 12, 2016 (7 pages).

\* cited by examiner

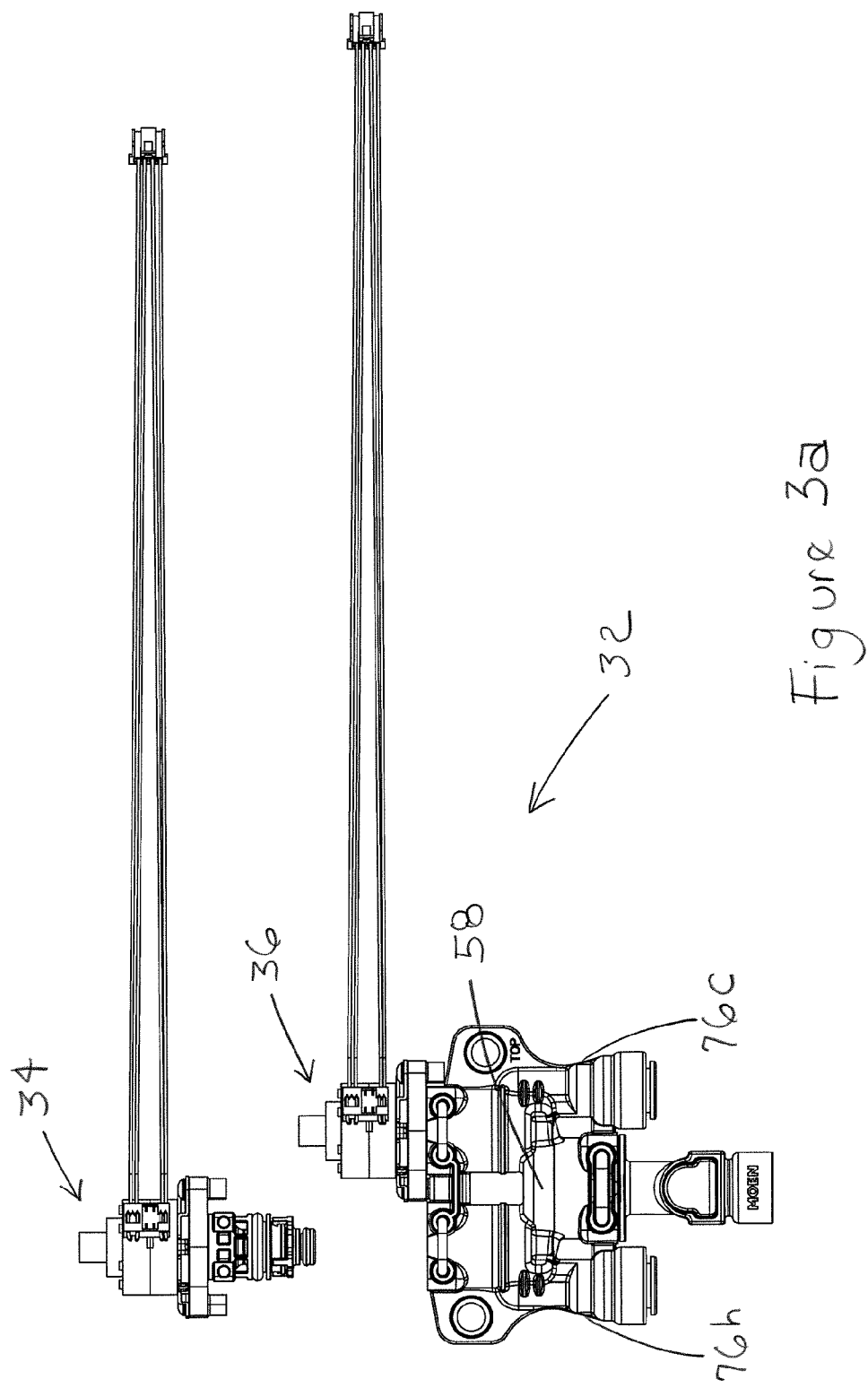

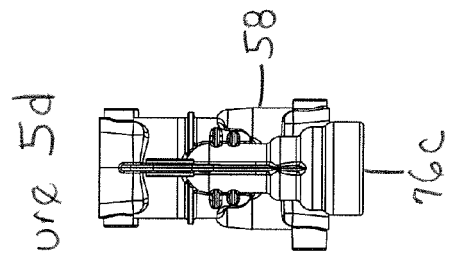
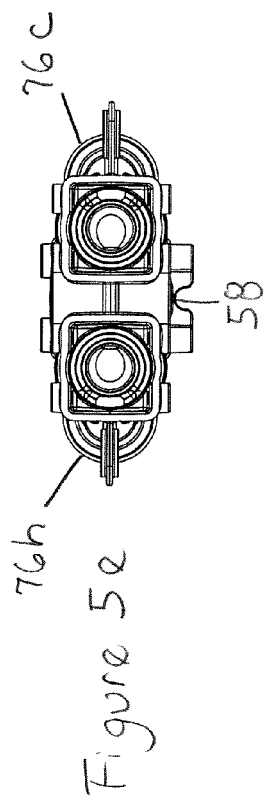
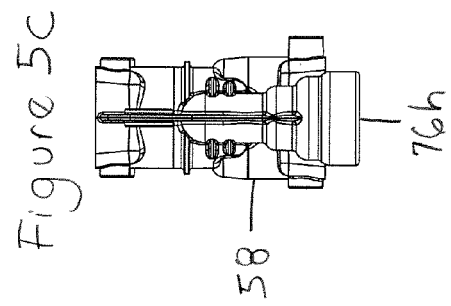
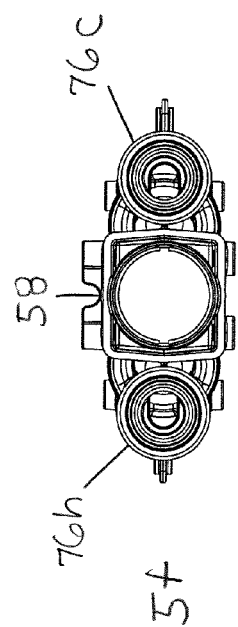
Figure 5a  Figure 5b  Figure 5c  Figure 5d  Figure 5e  Figure 5f

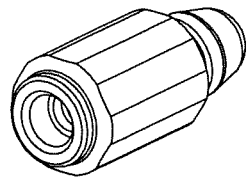
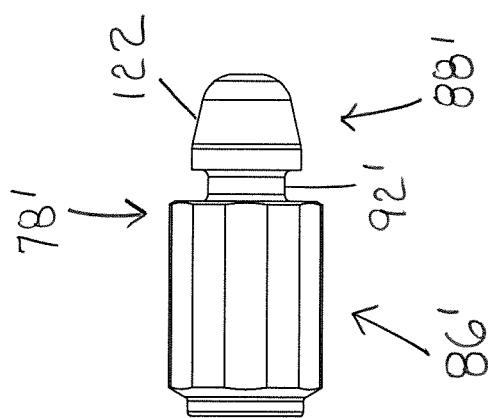
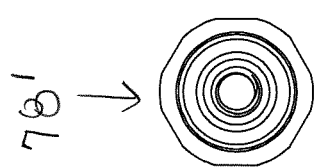
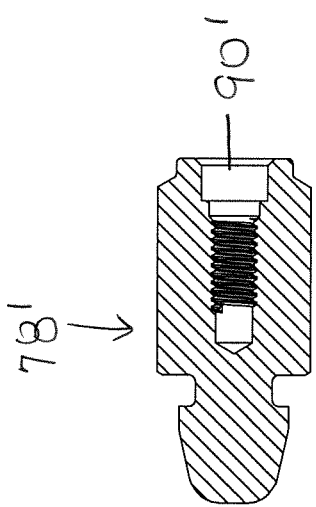

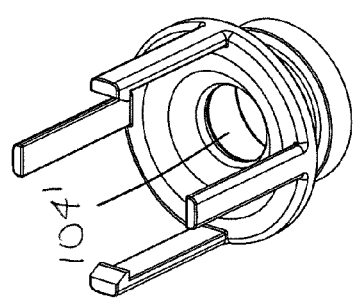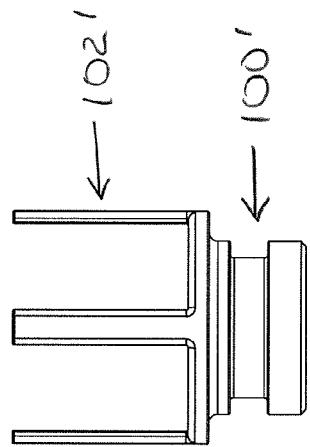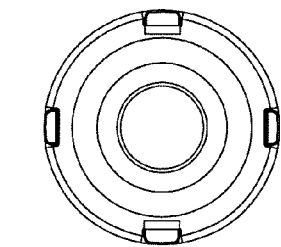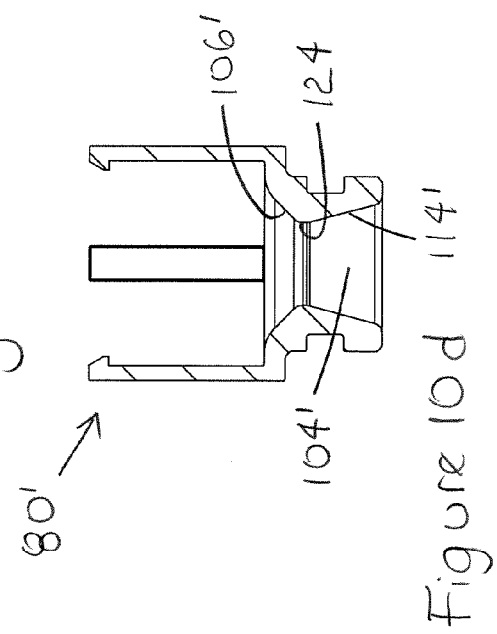

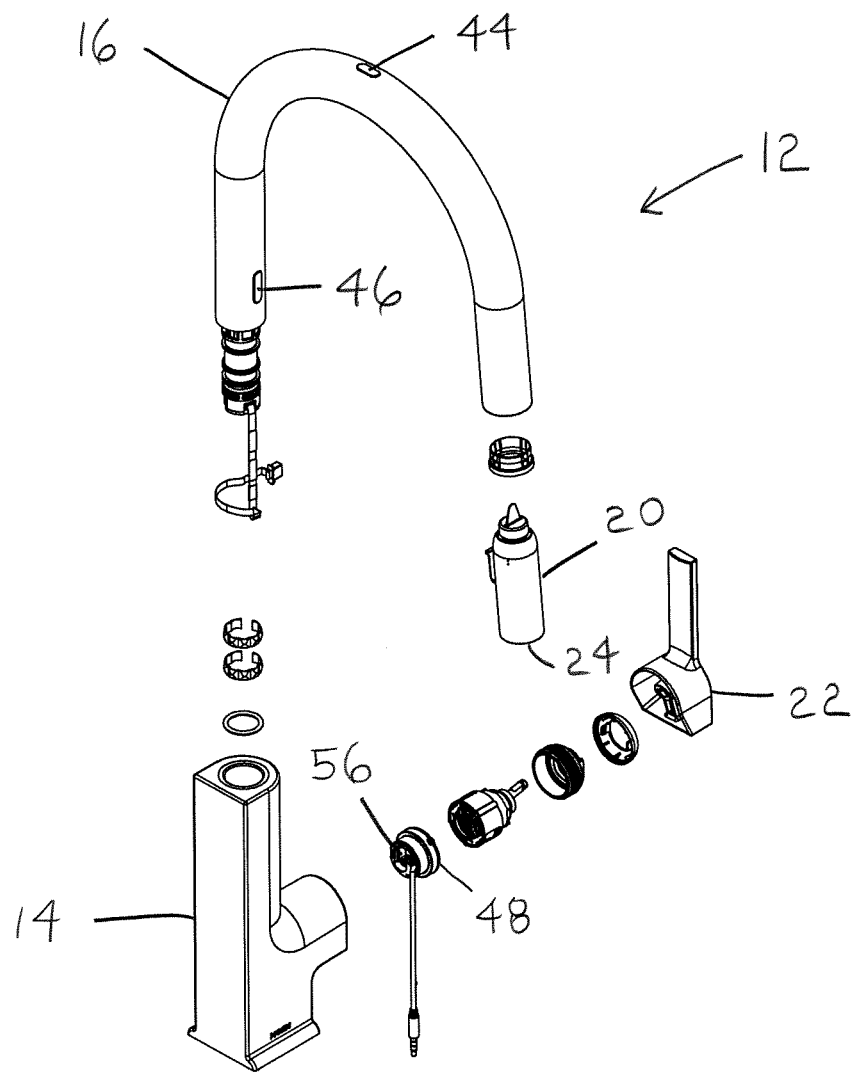
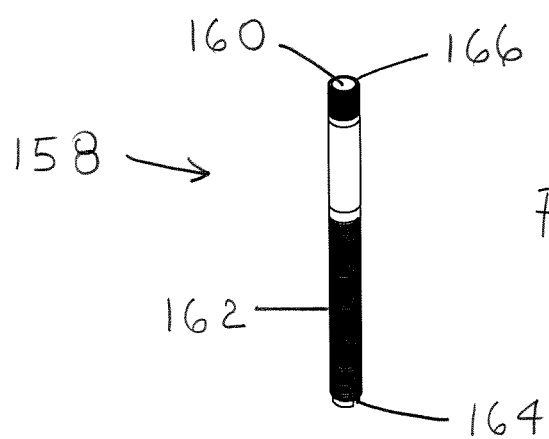
Figure 15

ELECTRONIC PLUMBING FIXTURE FITTING WITH FLOW MODULE

CROSS-REFERENCE TO RELATED APPLICATION

This application claims the benefit of U.S. Provisional Application No. 62/105,175, filed Jan. 19, 2015, the entire disclosure of which is hereby incorporated by reference.

FIELD

The present invention relates generally to an electronic plumbing fixture fitting with a flow module, such as an electronic faucet with a flow module.

BACKGROUND

Electronic plumbing fixture fittings, such as electronic faucets, are well known. Such electronic plumbing fixture fittings are used in residential and commercial applications, such as in kitchens, bathrooms, and various other locations.

SUMMARY

The present invention provides an electronic plumbing fixture fitting with a flow module.

In an exemplary embodiment, the electronic plumbing fixture fitting comprises a housing, a mounting shank, an electronic valve, a flow module, and a wand hose. The housing is operable to mount above a mounting surface. The housing includes a spout and a wand. The wand is operable to pull away from the spout. The wand includes a discharge outlet operable to deliver water. The mounting shank is operable to extend downwardly from the housing. The mounting shank is operable to extend through and below the mounting surface. The mounting shank is operable to extend behind a sink mounted in the mounting surface. The electronic valve is operable to permit flow of water through the discharge outlet when the electronic valve is activated and to not permit flow of water through the discharge outlet when the electronic valve is deactivated. The electronic valve is located inside the flow module. The flow module includes a bracket, a hot water inlet, a hot water passage, a cold water inlet, a cold water passage, a mixed water outlet, and a mixed water passage. The bracket includes a mounting portion. The mounting portion is operable to connect to the mounting shank. The hot water inlet is operable to receive hot water from a hot water supply. The hot water passage is operable to fluidly connect the hot water inlet and the electronic valve. The cold water inlet is operable to receive cold water from a cold water supply. The cold water passage is operable to fluidly connect the cold water inlet and the electronic valve. The mixed water outlet is operable to discharge mixed water to the discharge outlet. The mixed water passage is operable to fluidly connect the electronic valve and the mixed water outlet. The wand hose is operable to fluidly connect the mixed water outlet and the wand. The wand hose extends below the mounting surface and through the mounting surface and the spout. The flow module is operable to mount below the mounting surface and on the mounting shank.

In an exemplary embodiment, the electronic plumbing fixture fitting comprises a housing, a mounting shank, an electronic valve, a flow module, and a wand hose. The housing is operable to mount above a mounting surface. The housing includes a spout and a wand. The wand is operable to pull away from the spout. The wand includes a discharge outlet operable to deliver water. The mounting shank is operable to extend downwardly from the housing. The mounting shank is operable to extend through and below the mounting surface. The mounting shank is operable to extend behind a sink mounted in the mounting surface. The electronic valve is operable to permit flow of water through the discharge outlet when the electronic valve is activated and to not permit flow of water through the discharge outlet when the electronic valve is deactivated. The electronic valve is located inside the flow module. The flow module includes a bracket, a hot water inlet, a hot water passage, a cold water inlet, a cold water passage, a mixed water outlet, and a mixed water passage. The bracket includes a mounting portion. The mounting portion is operable to connect to the mounting shank. The mounting portion includes a generally C-shaped clip that is operable to connect to the mounting shank. The hot water inlet is operable to receive hot water from a hot water supply. The hot water passage is operable to fluidly connect the hot water inlet and the electronic valve. The cold water inlet is operable to receive cold water from a cold water supply. The cold water passage is operable to fluidly connect the cold water inlet and the electronic valve. The mixed water outlet is operable to discharge mixed water to the discharge outlet. The mixed water passage is operable to fluidly connect the electronic valve and the mixed water outlet. The wand hose is operable to fluidly connect the mixed water outlet and the wand. The wand hose extends below the mounting surface and through the mounting surface and the spout. The flow module is operable to mount below the mounting surface and on the mounting shank.

In an exemplary embodiment, the electronic plumbing fixture fitting comprises a housing, a mounting shank, an electronic valve, a flow module, and a wand hose. The housing is operable to mount above a mounting surface. The housing includes a spout and a wand. The wand is operable to pull away from the spout. The wand includes a discharge outlet operable to deliver water. The mounting shank is operable to extend downwardly from the housing. The mounting shank is operable to extend through and below the mounting surface. The mounting shank is operable to extend behind a sink mounted in the mounting surface. The electronic valve is operable to permit flow of water through the discharge outlet when the electronic valve is activated and to not permit flow of water through the discharge outlet when the electronic valve is deactivated. The electronic valve is located inside the flow module. The flow module includes a top side, a bottom side, a bracket, a hot water inlet, a hot water passage, a cold water inlet, a cold water passage, a mixed water outlet, and a mixed water passage. The top side is opposite the bottom side. The bracket extends from the top side of the flow module. The bracket includes a mounting portion. The mounting portion is operable to connect to the mounting shank. The mounting portion includes a generally C-shaped clip that is operable to connect to the mounting shank. The hot water inlet is operable to receive hot water from a hot water supply. The hot water inlet is located in the bottom side of the flow module. The hot water passage is operable to fluidly connect the hot water inlet and the electronic valve. The cold water inlet is operable to receive cold water from a cold water supply. The cold water inlet is located in the bottom side of the flow module. The cold water passage is operable to fluidly connect the cold water inlet and the electronic valve. The mixed water outlet is operable to discharge mixed water to the discharge outlet. The mixed water outlet is located in the bottom side of the flow module. The mixed water passage is operable to fluidly connect the electronic valve and the mixed water outlet. The wand hose is operable to fluidly connect the mixed water outlet and the wand. The wand hose extends below the mounting surface and through the mounting surface and the spout. The flow module is operable to mount below the mounting surface and on the mounting shank.

BRIEF DESCRIPTION OF THE DRAWINGS

FIGS. 3a and 3b include views of an electronic mixing valve, including a hot water electronic valve, a cold water electronic valve, and a housing, according to an exemplary embodiment of the present invention—FIG. 3a is an exploded perspective view, and FIG. 3b is a central cross-sectional view;

—FIG. 4a is a perspective view, FIG. 4b is an exploded perspective view, FIG. 4c is a front view, FIG. 4d is a top view, FIG. 4e is a bottom view, and FIG. 4f is a central cross-sectional view;

FIGS. 5a-5g include views of the housing of FIGS. 3a and 3b, according to an exemplary embodiment of the present invention—FIG. 5a is a perspective view, FIG. 5b is a front view, FIG. 5c is a left view, FIG. 5d is a right view, FIG. 5e is a top view, FIG. 5f is a bottom view, and FIG. 5g is a central cross-sectional view;

—FIG. 6a is a perspective view, FIG. 6b is a front view, FIG. 6c is a left view, FIG. 6d is a central cross-sectional view, and FIG. 6e is a detailed front view of the nose;

—FIG. 7a is a perspective view, FIG. 7b is a front view, FIG. 7c is a top view, FIG. 7d is a central cross-sectional view, and FIG. 7e is a detailed central cross-sectional view of a portion of the body;

FIGS. 8a-8e include central cross-sectional views of the piston and the seat of FIGS. 6a-6e and 7a-7e during various phases of operation of the hot/cold water electronic valve of FIGS. 4a-4f incorporating the piston and the seat of FIGS. 6a-6e and 7a-7e—FIG. 8a shows a completely closed position, FIG. 8b shows a cracked open position, FIG. 8c shows an open position in which flow begins to increase, FIG. 8d shows a half open position, and FIG. 8e shows a completely open position;

FIGS. 9a-9d include views of another embodiment of a piston, including a body and a nose, according to another exemplary embodiment of the present invention—FIG. 9a is a perspective view, FIG. 9b is a front view, FIG. 9c is a left view, and FIG. 9d is a central cross-sectional view;

FIGS. 10a-10d include views of another embodiment of a seat, including a body and projections, according to another exemplary embodiment of the present invention—FIG. 10a is a perspective view, FIG. 10b is a front view, FIG. 10c is a top view, and FIG. 10d is a central cross-sectional view;

FIGS. 11a-11e include central cross-sectional views of the piston and the seat of FIGS. 9a-9d and 10a-10d during various phases of operation of the hot/cold water electronic valve of FIGS. 4a-4f incorporating the piston and the seat of FIGS. 9a-9d and 10a-10d—FIG. 11a shows a completely closed position, FIG. 11b shows a cracked open position, FIG. 11c shows an open position in which flow begins to increase, FIG. 11d shows a half open position, and FIG. 11e shows a completely open position;

—FIG. 12a is a top perspective view, FIG. 12b is a bottom perspective view, and FIG. 12c is an exploded bottom perspective view;

—FIG. 13a is a front view, FIG. 13b is a cross-sectional view taken along the line 13b-13b in FIG. 13a, FIG. 13c is a cross-sectional view taken along the line 13c-13c in FIG. 13a, and FIG. 13d is a cross-sectional view taken along the line 13d-13d in FIG. 13a;

—FIG. 14a is a top view, FIG. 14b is a left side view, FIG. 14c is a right side view, and FIG. 14d is a cross-sectional view taken along the line 14d-14d in FIG. 14a;

FIG. 15 is an exploded perspective view of portions of the electronic faucet of FIG. 2, including a mounting shank, according to an exemplary embodiment of the present invention; —FIG. 16a is a bottom perspective view, and FIG. 16b is a front view.

DETAILED DESCRIPTION

The present invention provides an electronic plumbing fixture fitting. In an exemplary embodiment, the electronic plumbing fixture fitting is an electronic faucet. However, one of ordinary skill in the art will appreciate that the electronic plumbing fixture fitting could be an electronic showering system, an electronic showerhead, an electronic handheld shower, an electronic body spray, an electronic side spray, or any other electronic plumbing fixture fitting.

Figure 1:
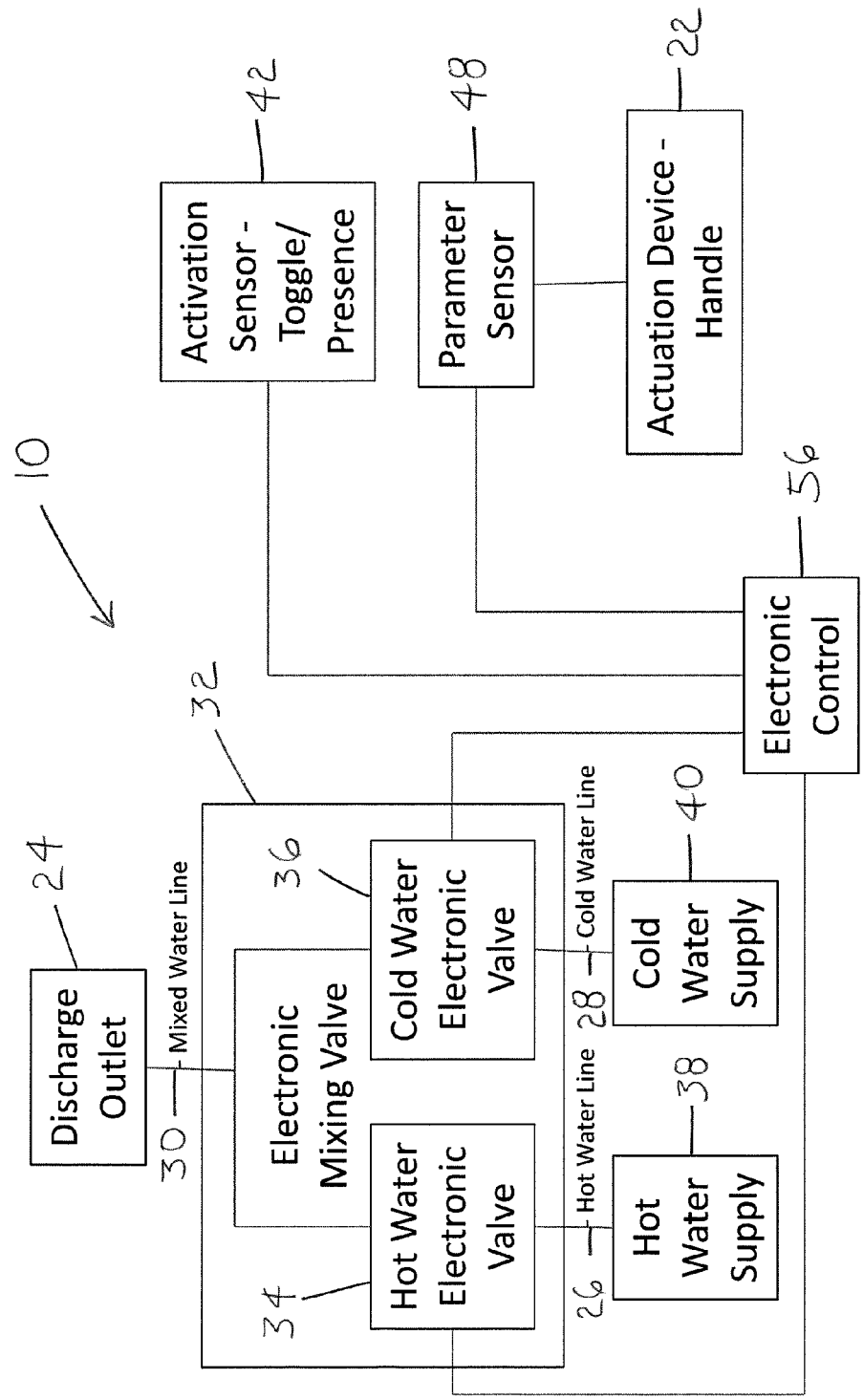
FIG. 1 is a schematic illustration of an electronic plumbing fixture fitting according to an exemplary embodiment of the present invention.

An exemplary embodiment of an electronic plumbing fixture fitting 10, such as an electronic faucet 12, is illustrated in FIG. 1. An exemplary embodiment of the electronic faucet 12 is illustrated in FIG. 2.

Figure 2:
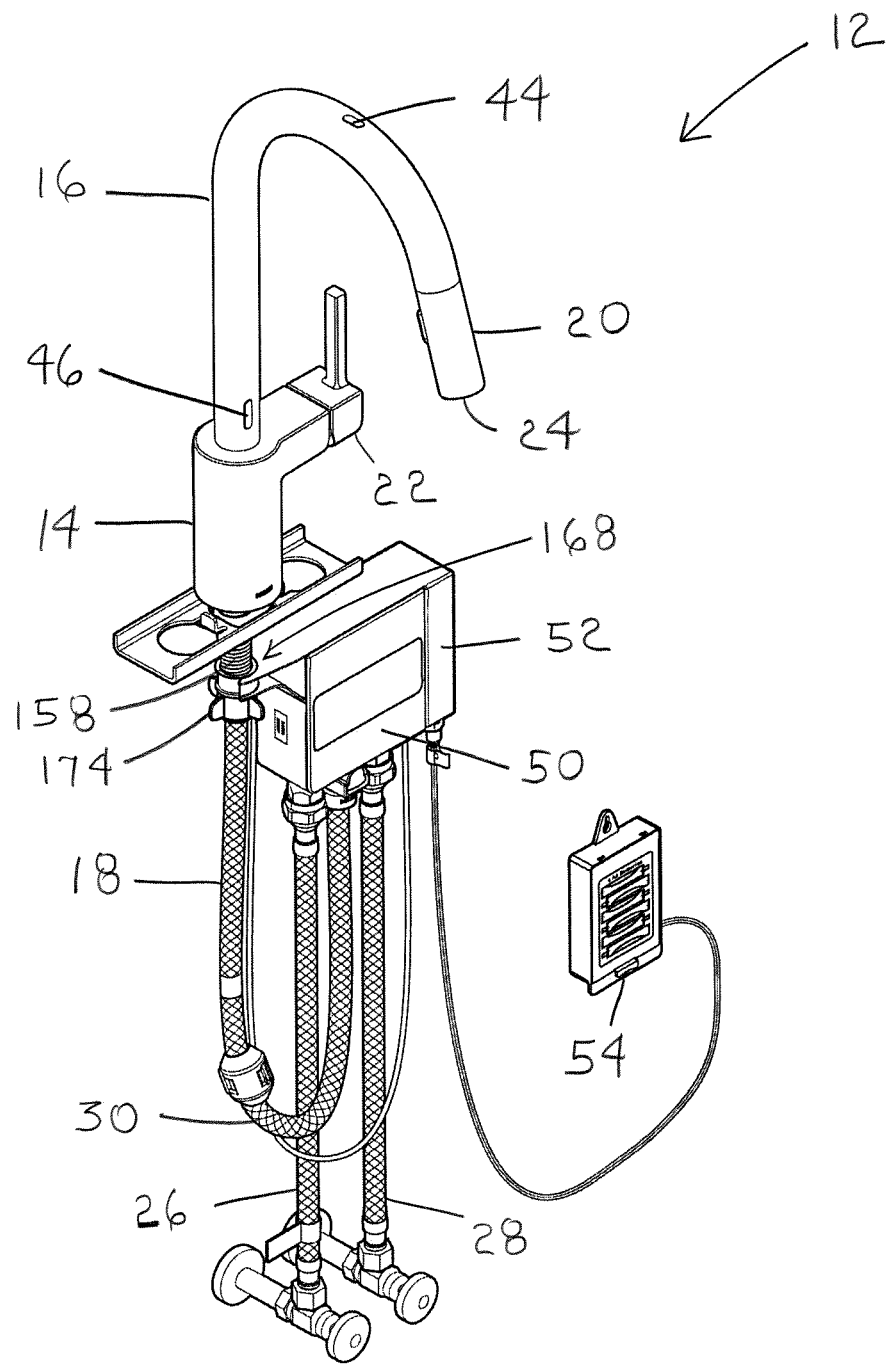
FIG. 2 is a perspective view of an electronic faucet according to an exemplary embodiment of the present invention.
Figure 3B:
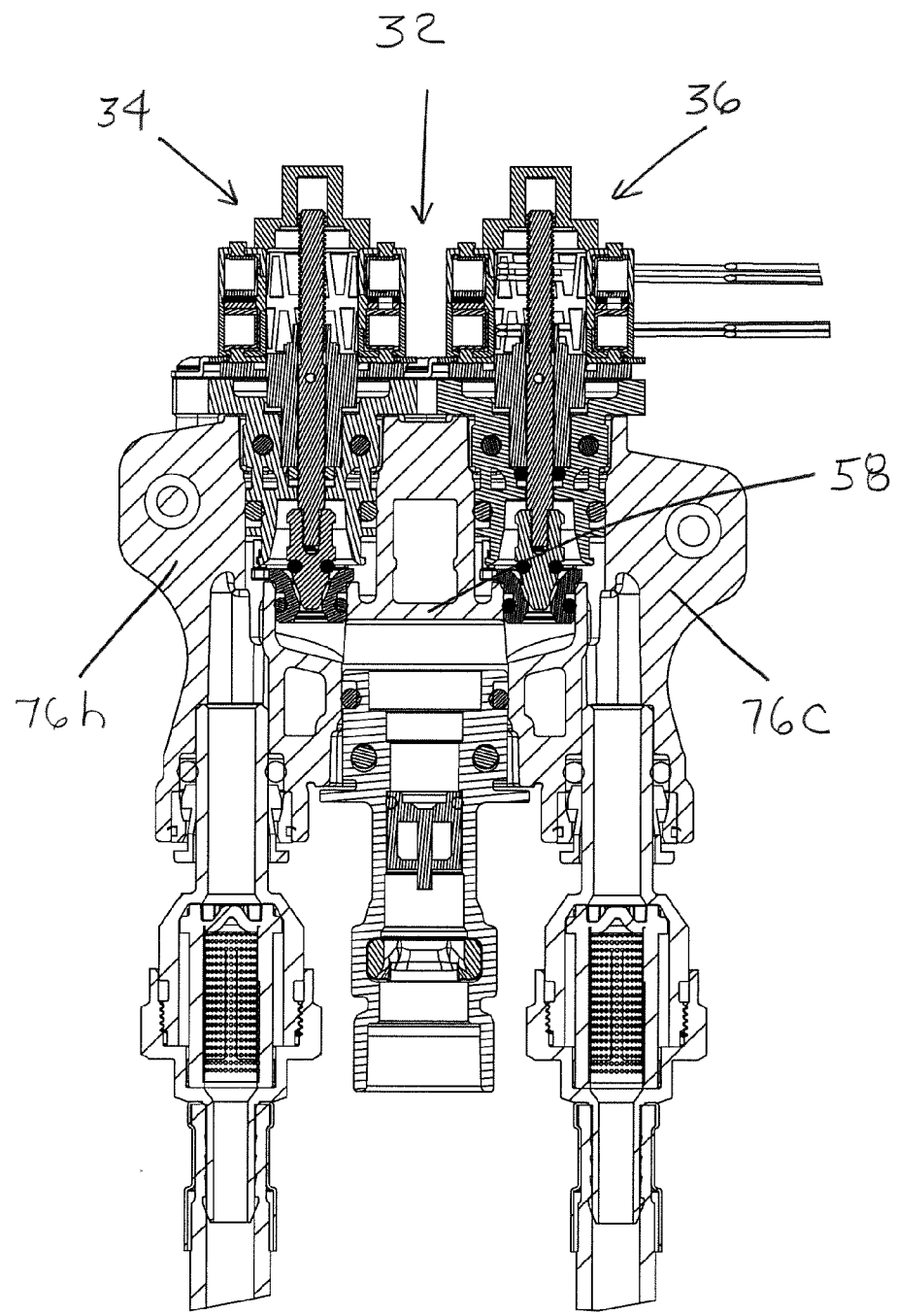
Figure 4A:
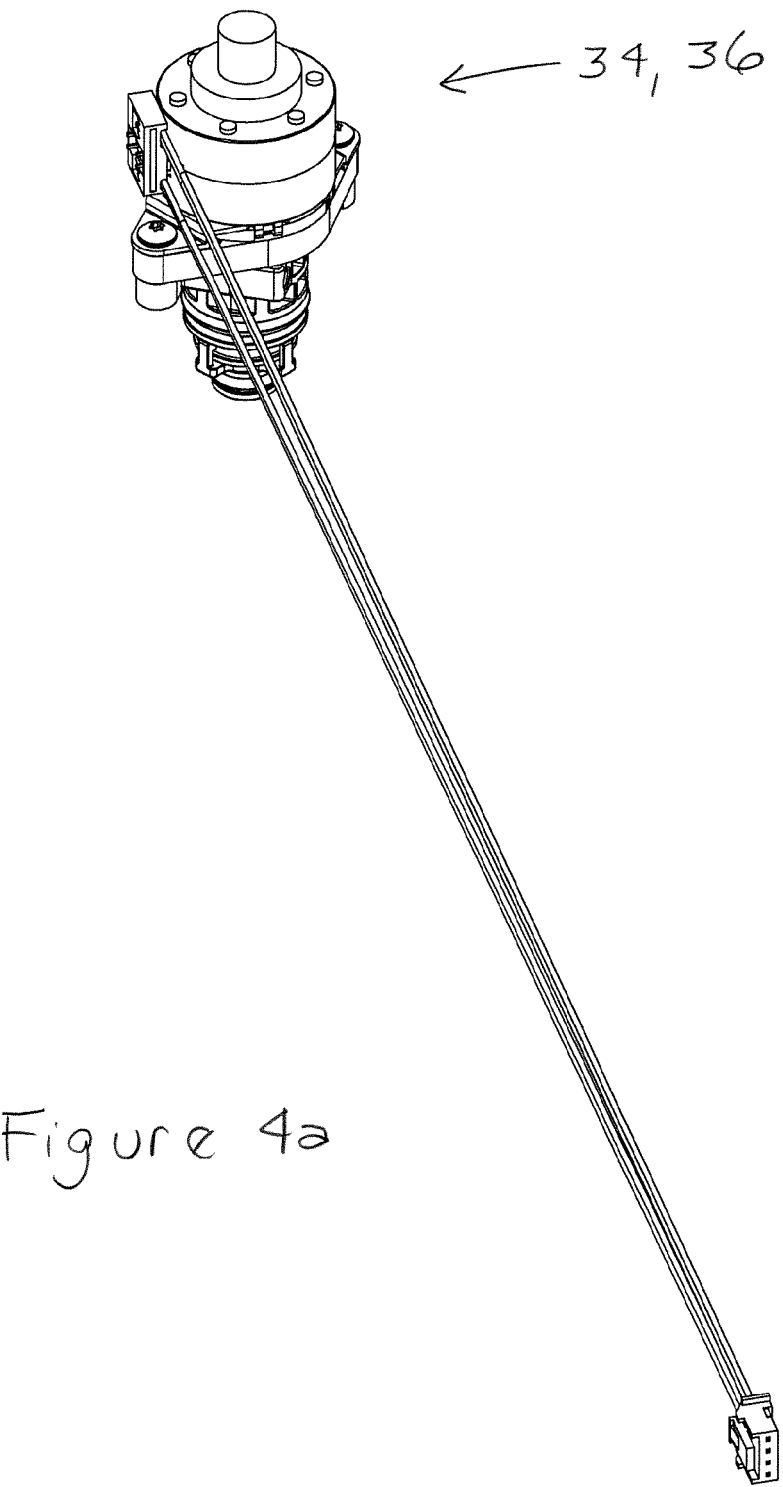
FIGS. 4a-4f include views of the hot/cold water electronic valve of FIGS. 3a and 3b, including a piston and a seat, according to an exemplary embodiment of the present invention
Figure 4B:
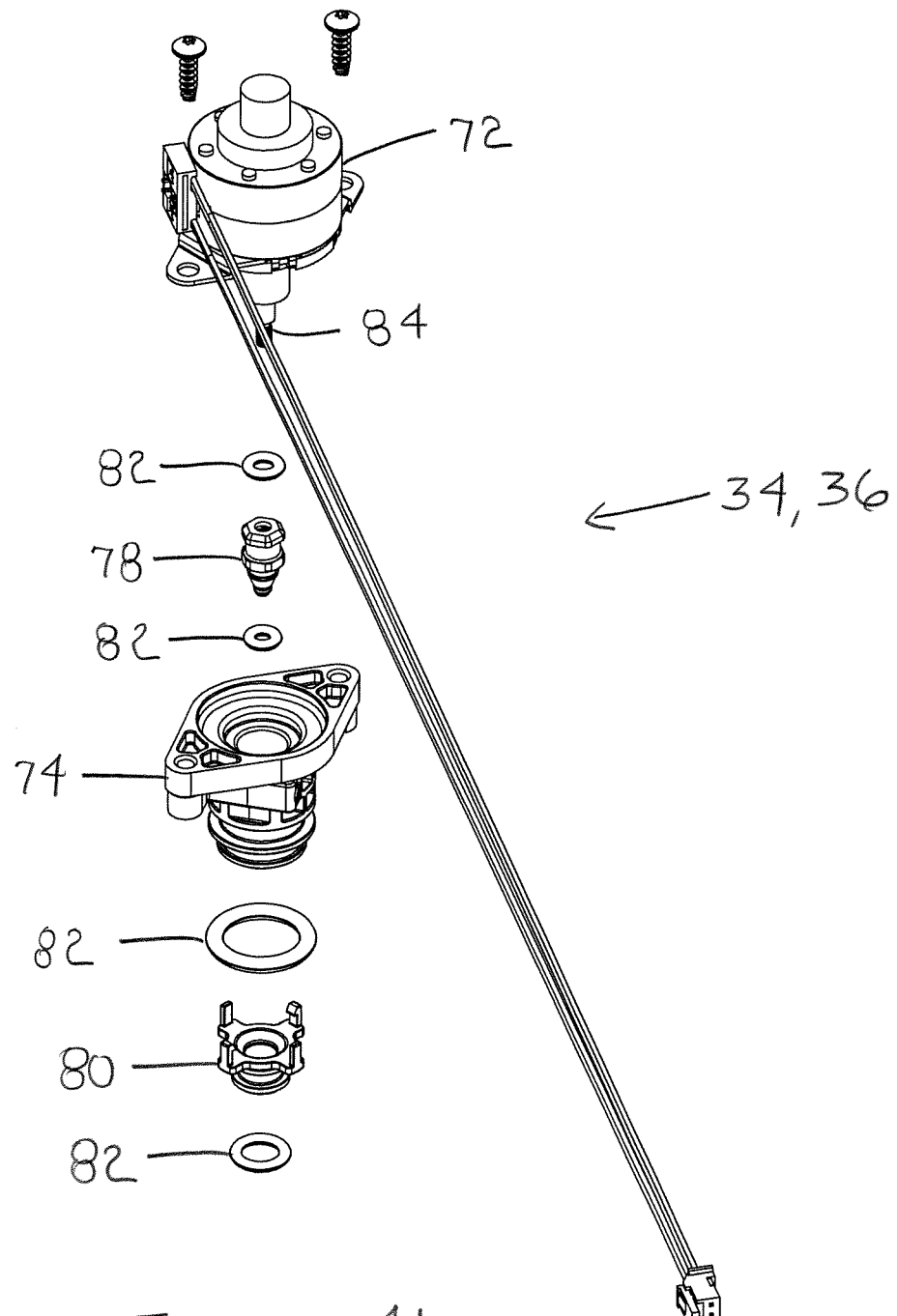
Figure 4D:
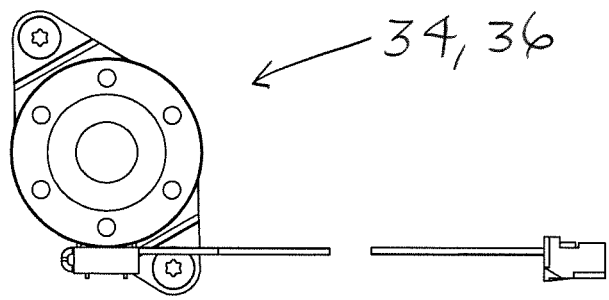
Figure 4C:
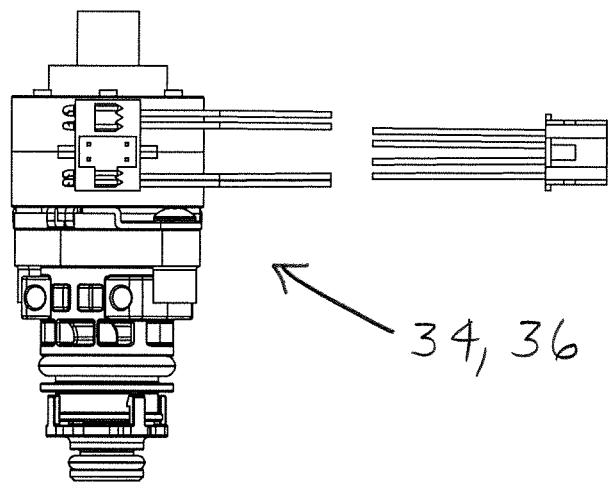
Figure 4E:
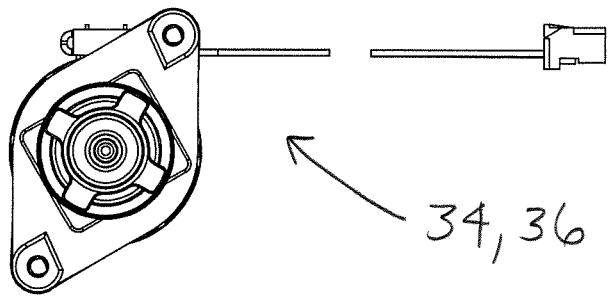
Figure 4F:
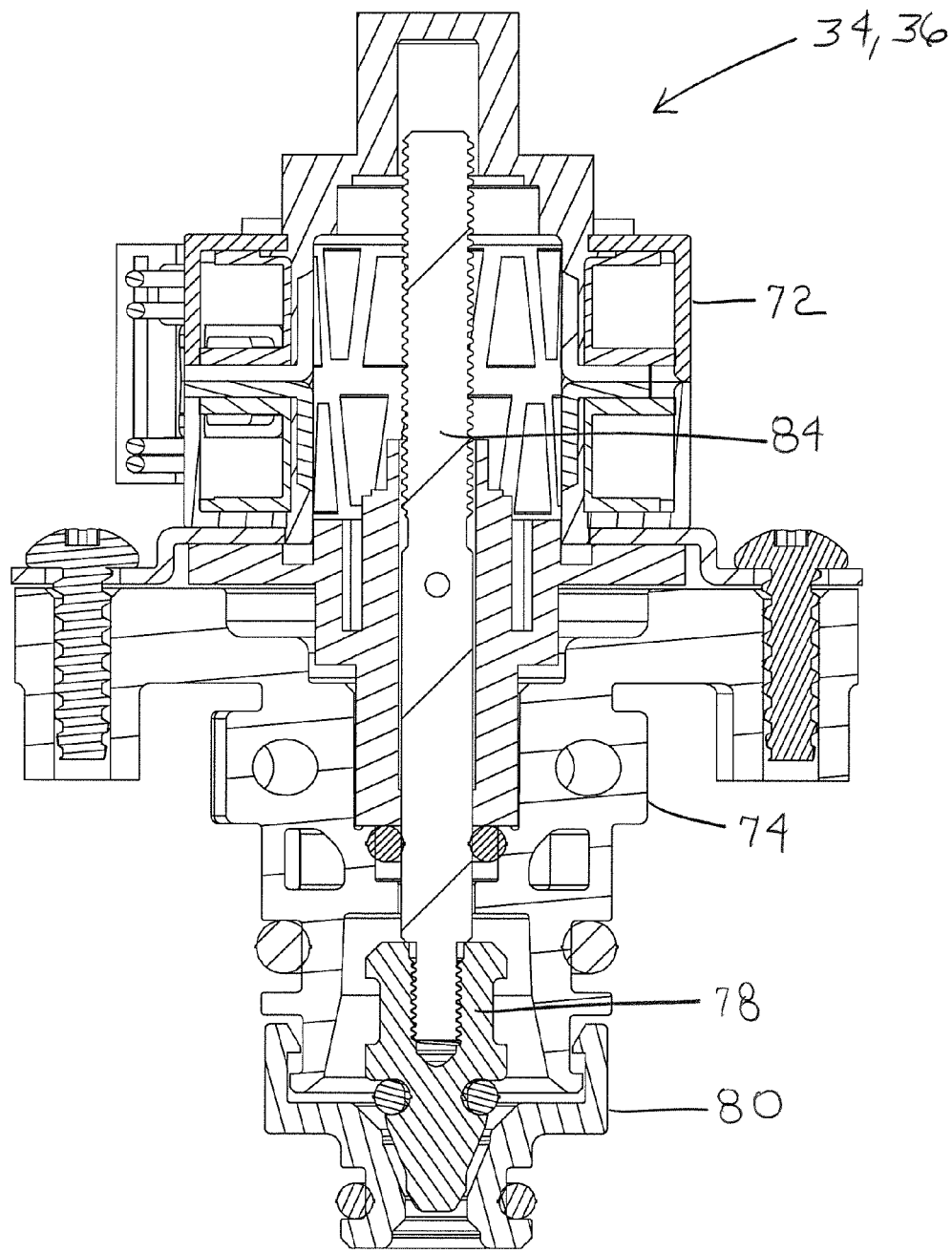
Figure 5A:
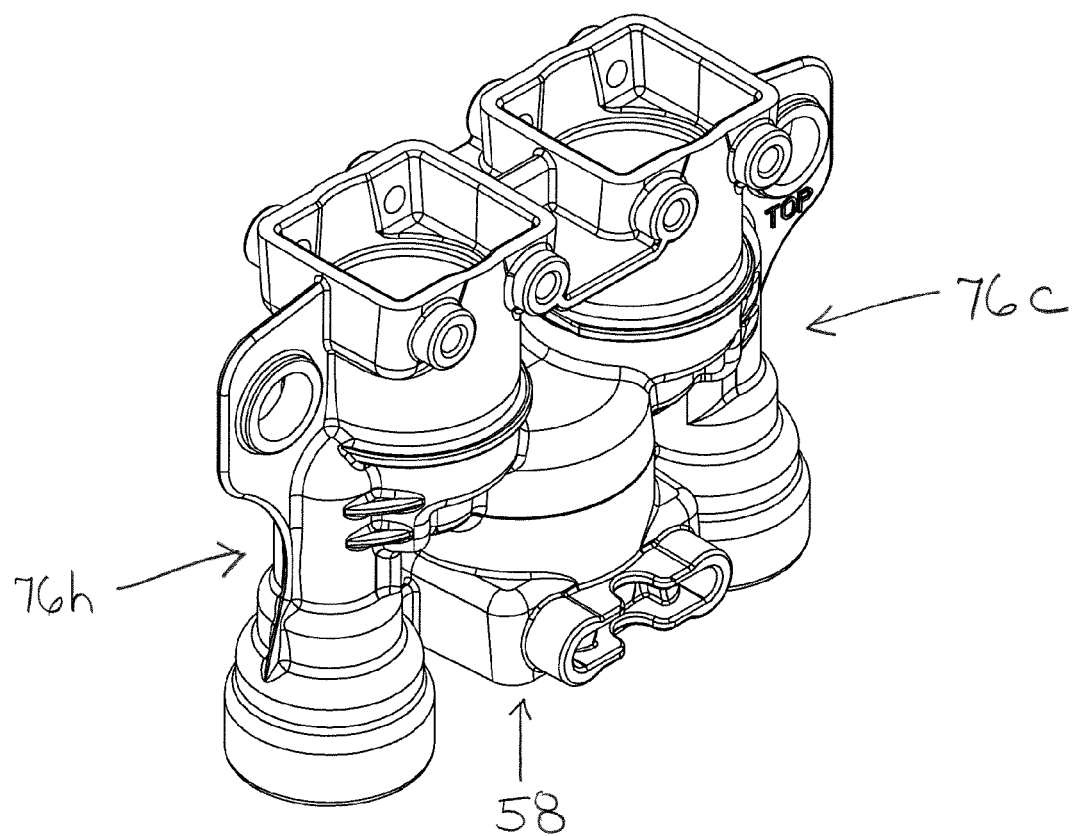
Figure 59:
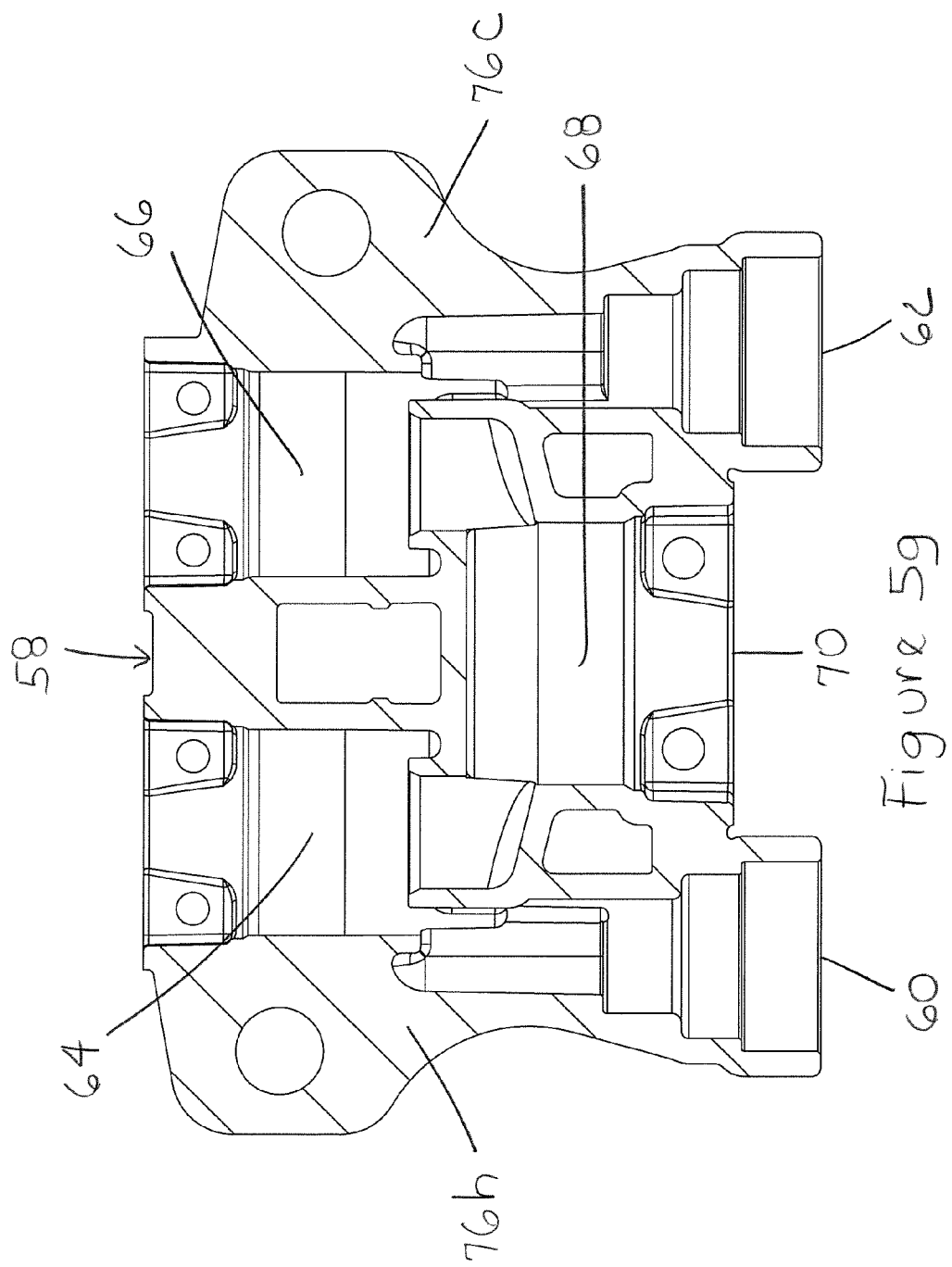
Figure 6A:
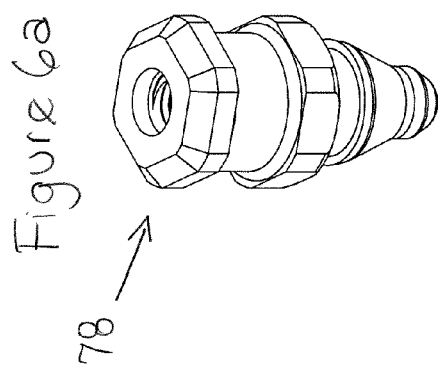
FIGS. 6a-6e include views of the piston of FIGS. 4a-4f, including a body and a nose, according to an exemplary embodiment of the present invention
Figure 6B:
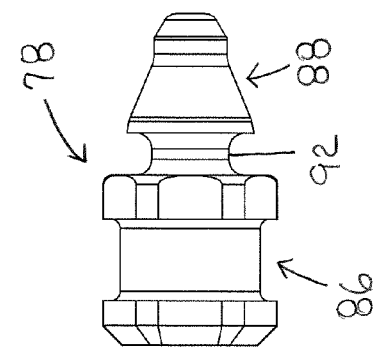
Figure 6E:
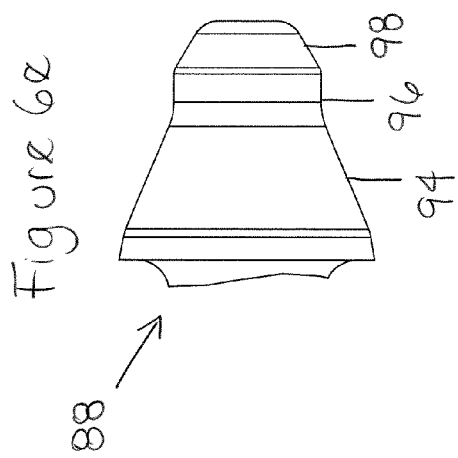
Figure 6C:
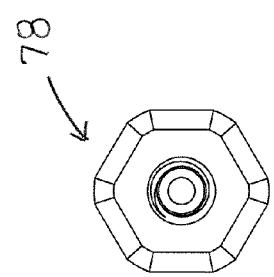
Figure 6D:
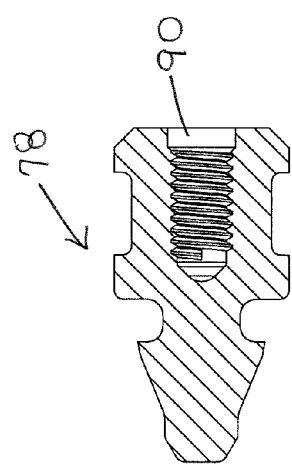
Figure 7A:
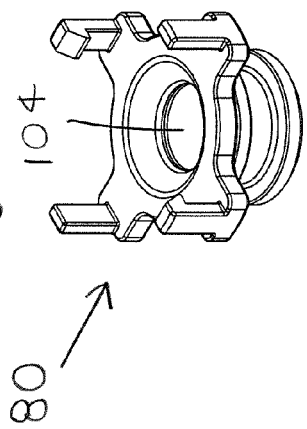
FIGS. 7a-7e include views of the seat of FIGS. 4a-4f, including a body and projections, according to an exemplary embodiment of the present invention
Figure 7B:
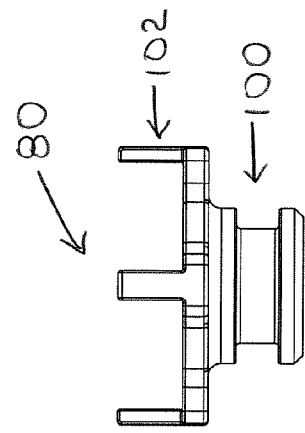
Figure 7C:
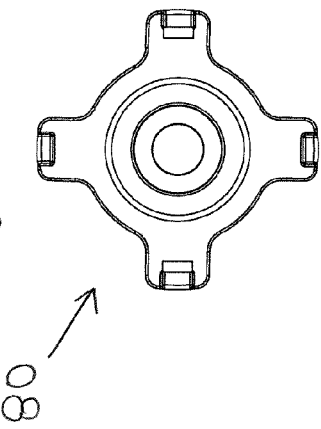
Figure 7D:
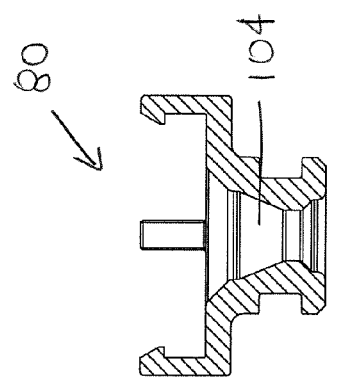
Figure 7E:
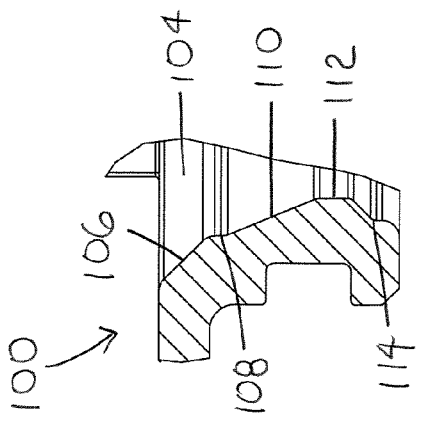
Figure 8A:
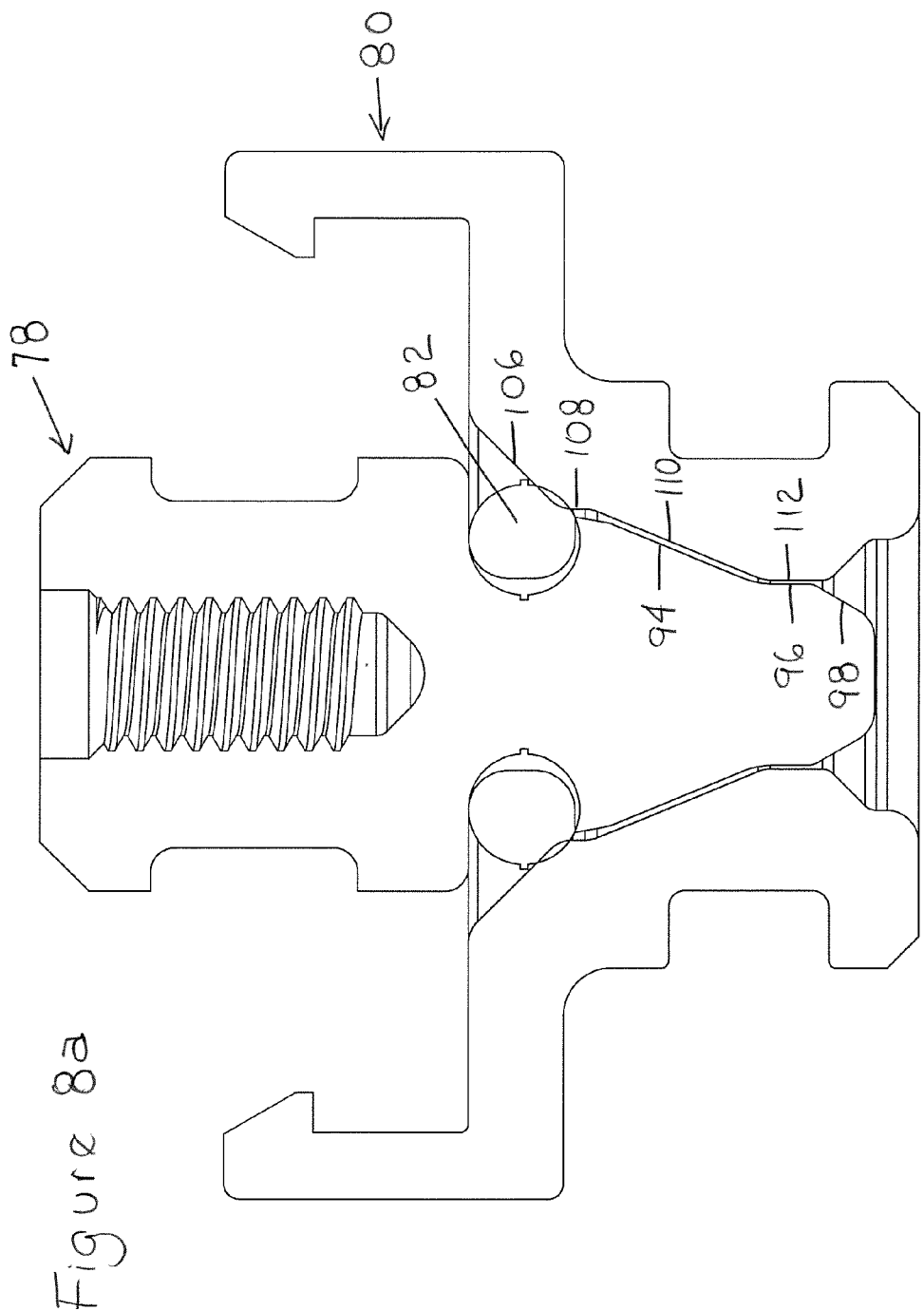
Figure 8B:
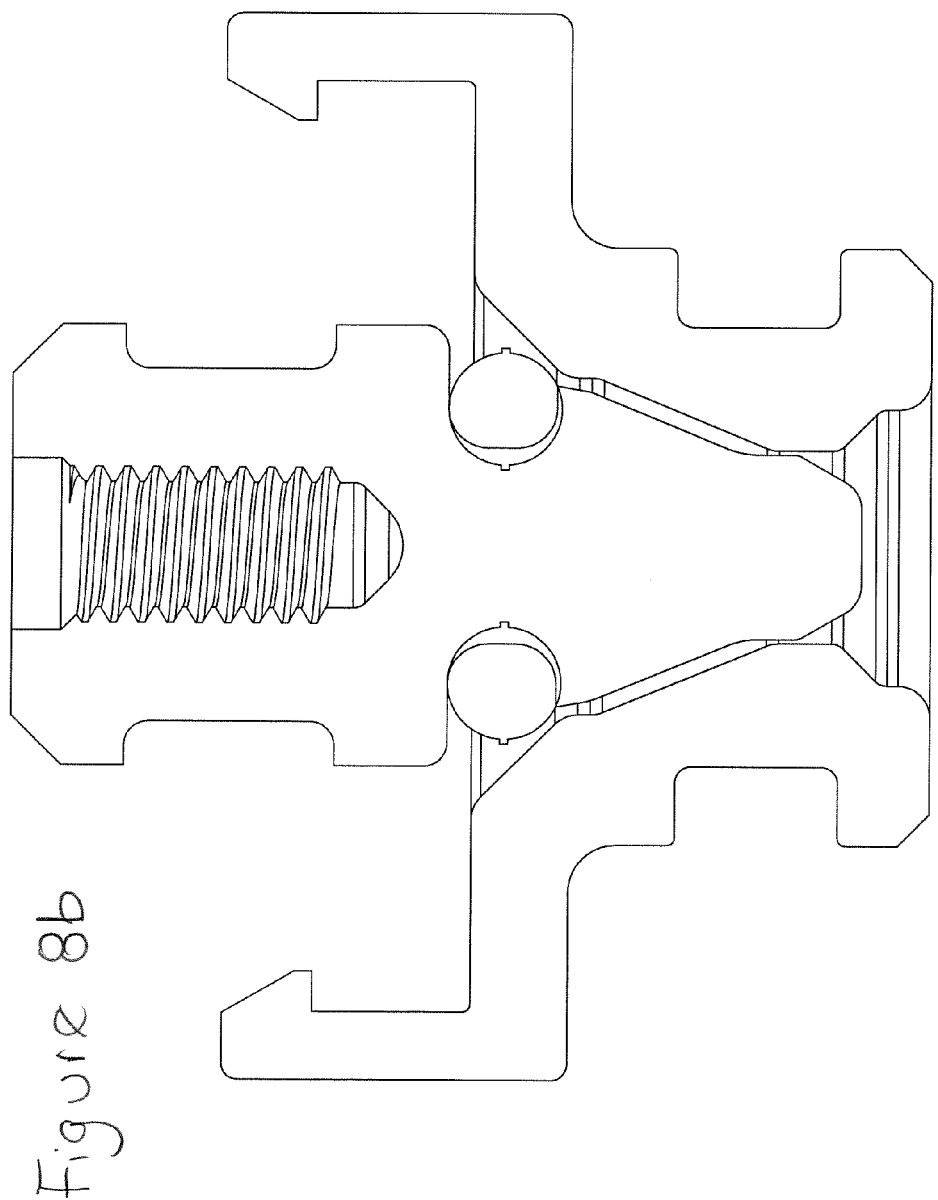
Figure 8C:
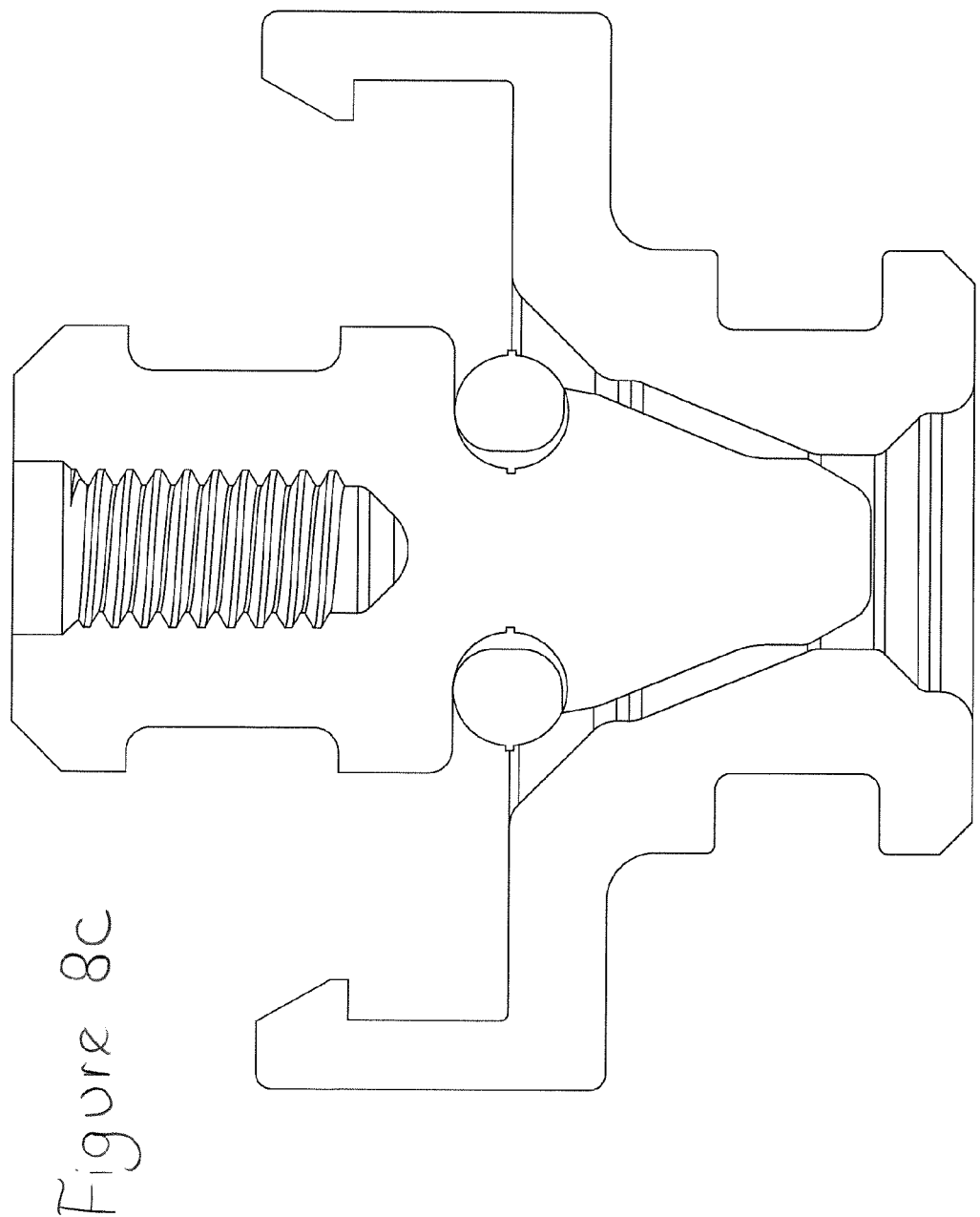
Figure 8D:
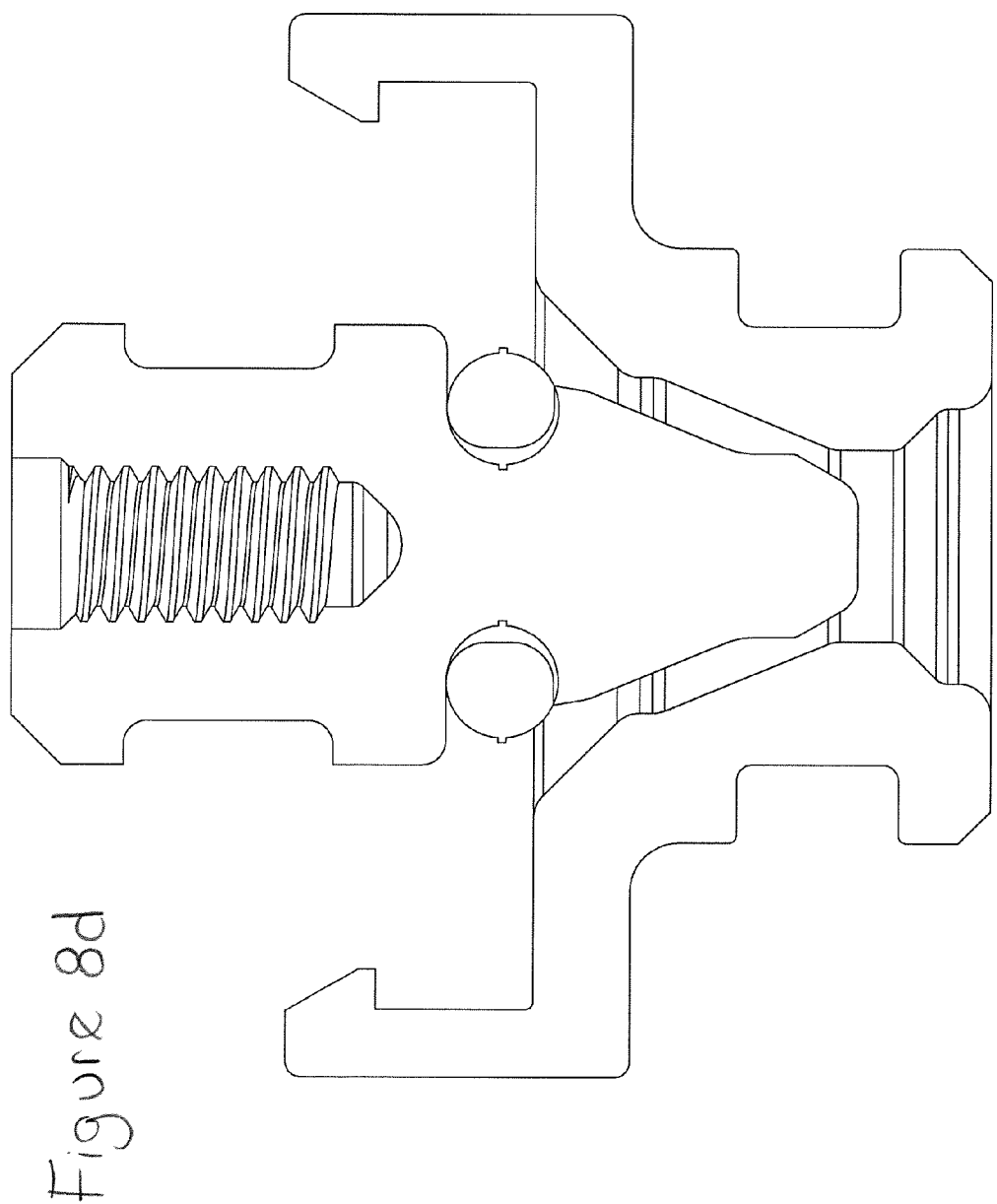
Figure 8A:
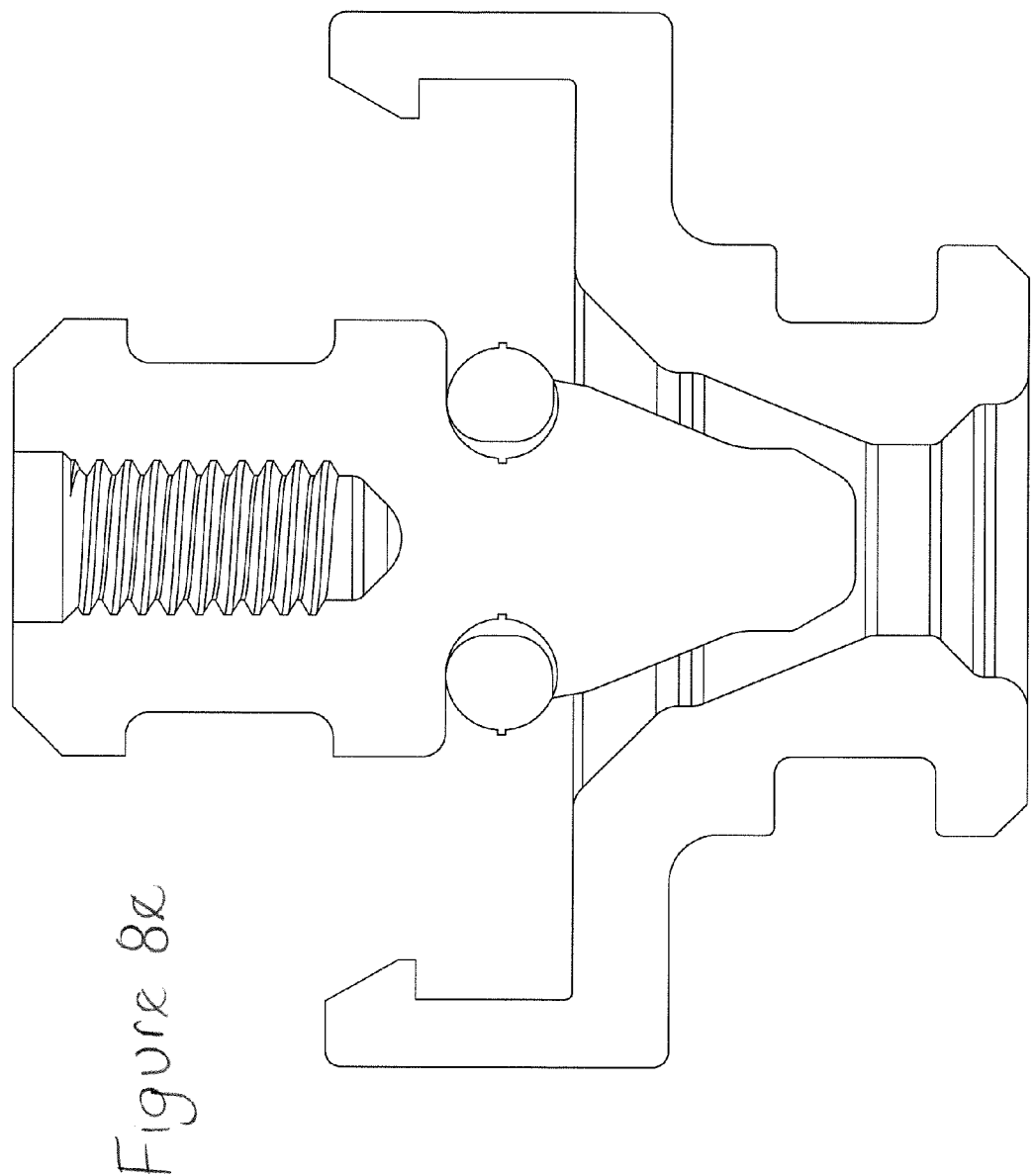
Figure 11A:
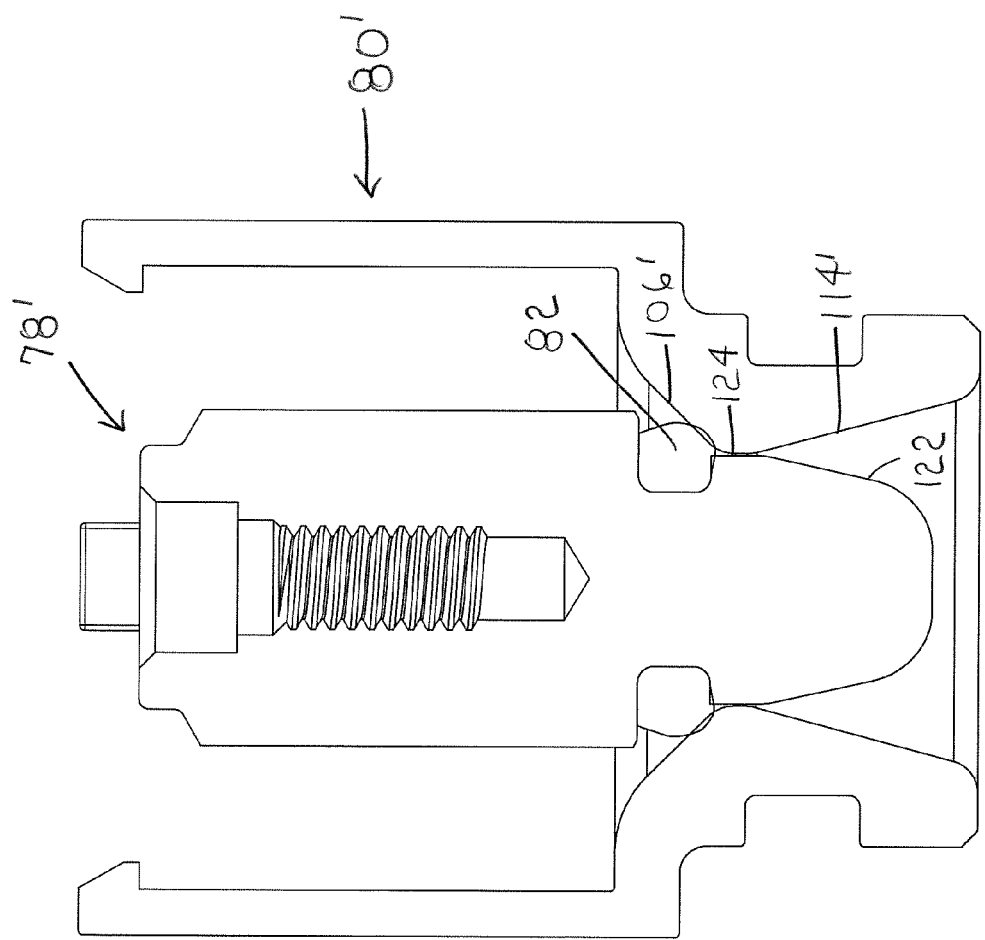
Figure 11B:
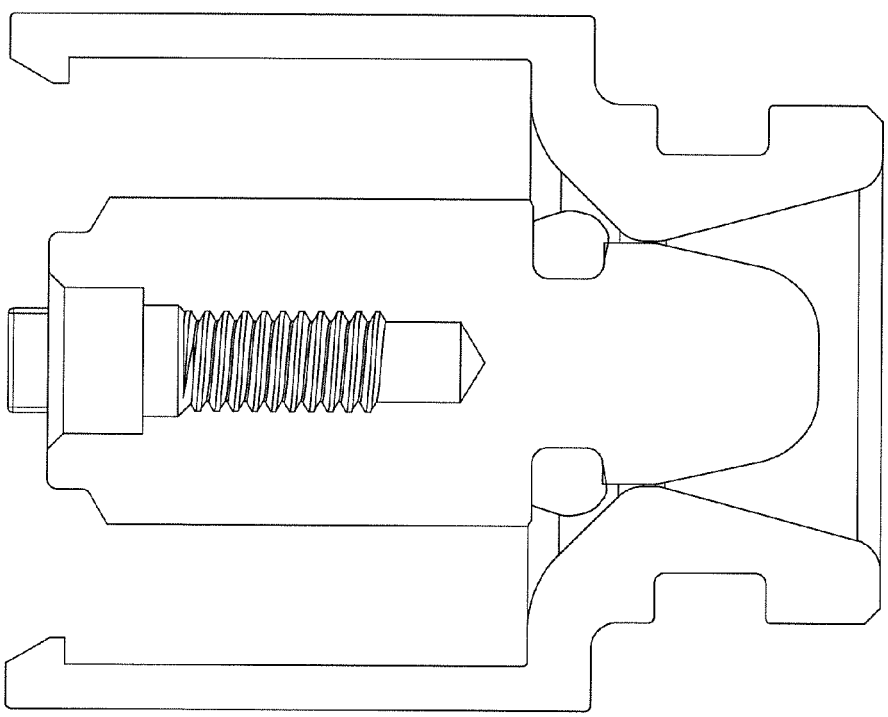
Figure 11C:
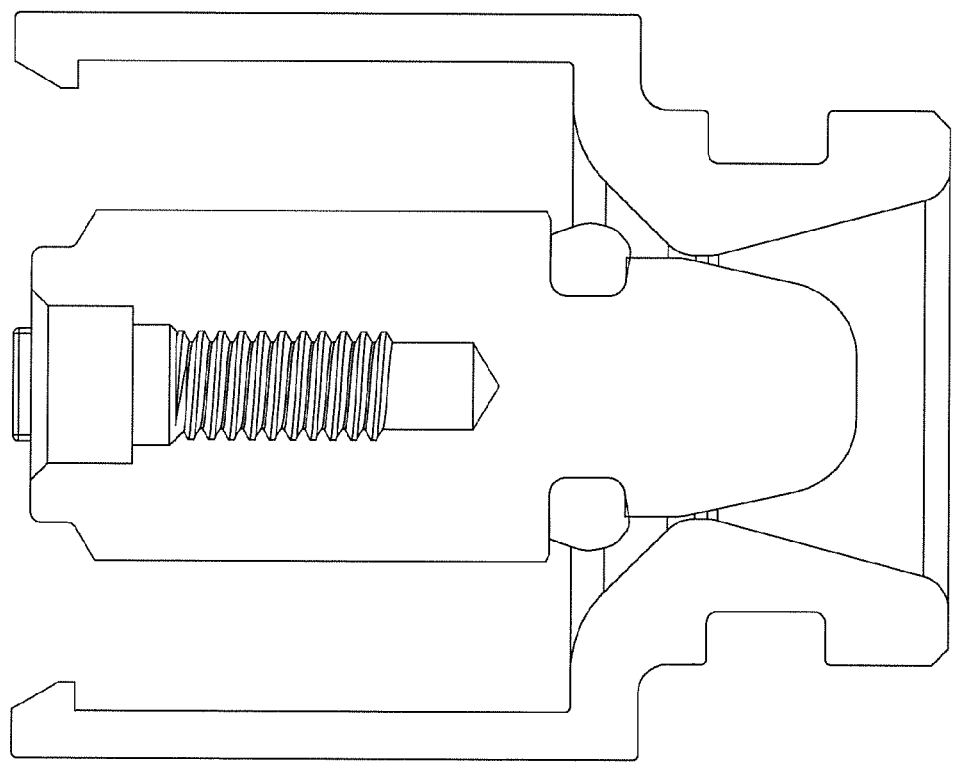
Figure 11D:
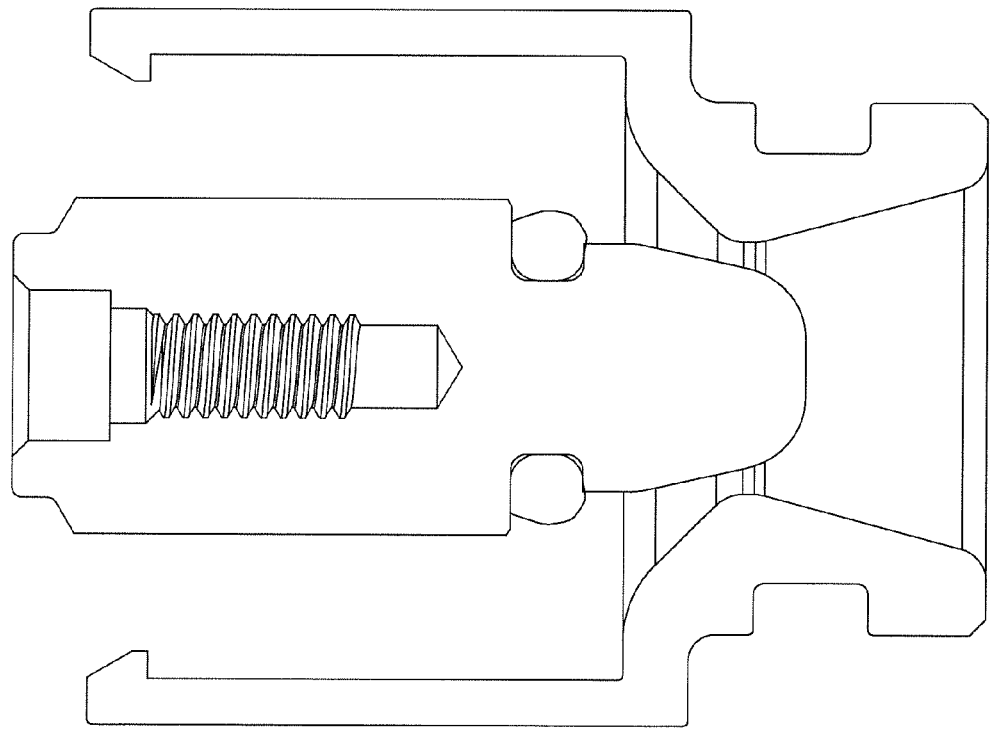
Figure 11A:
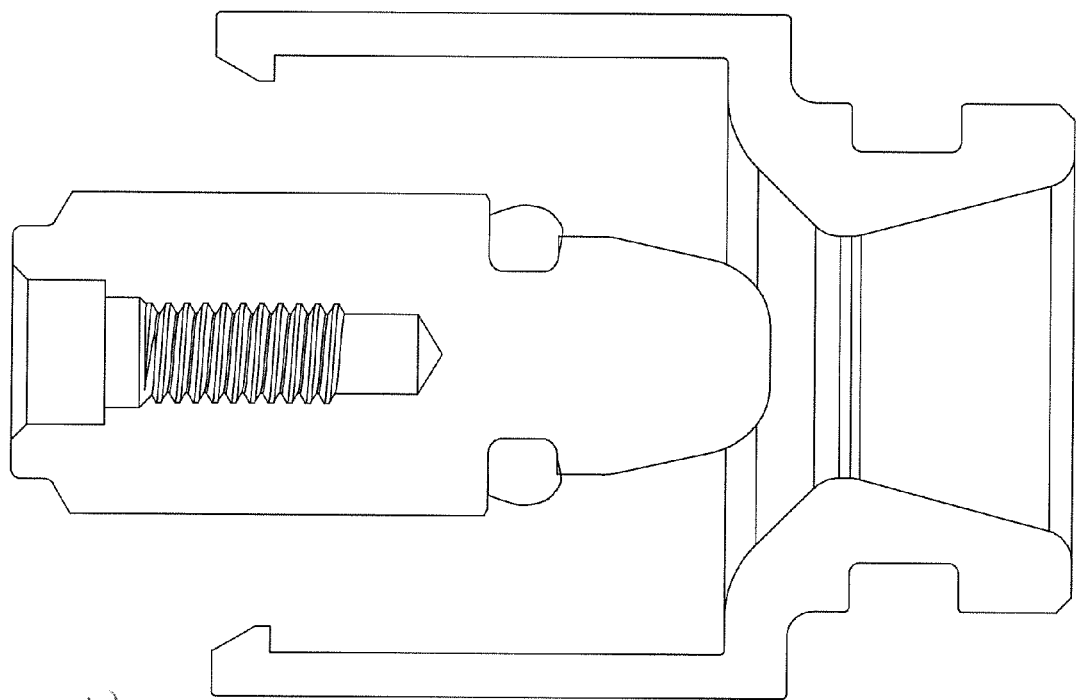
Figure 12A:
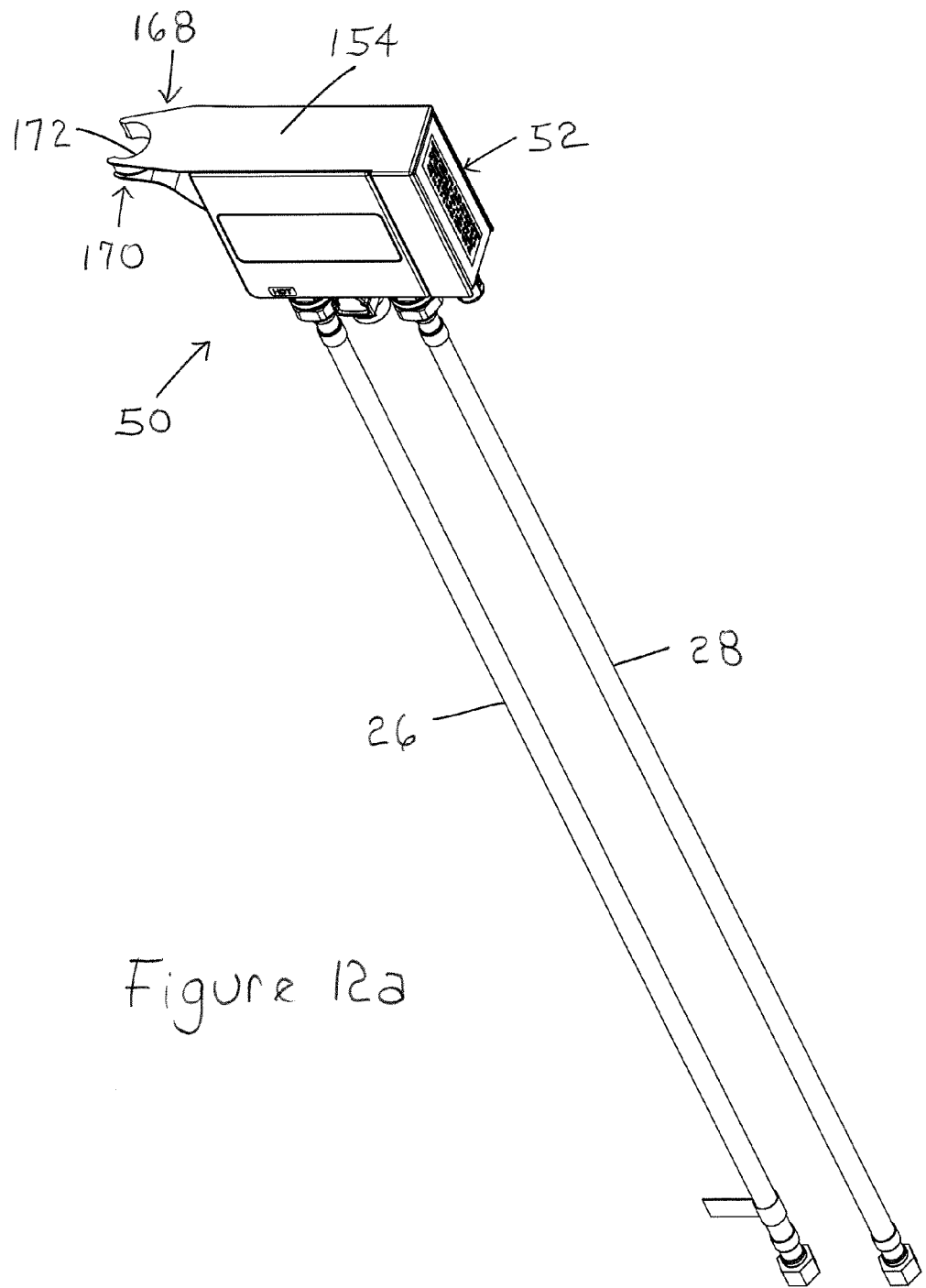
FIGS. 12a-12c include views of a flow module according to an exemplary embodiment of the present invention
Figure 12B:
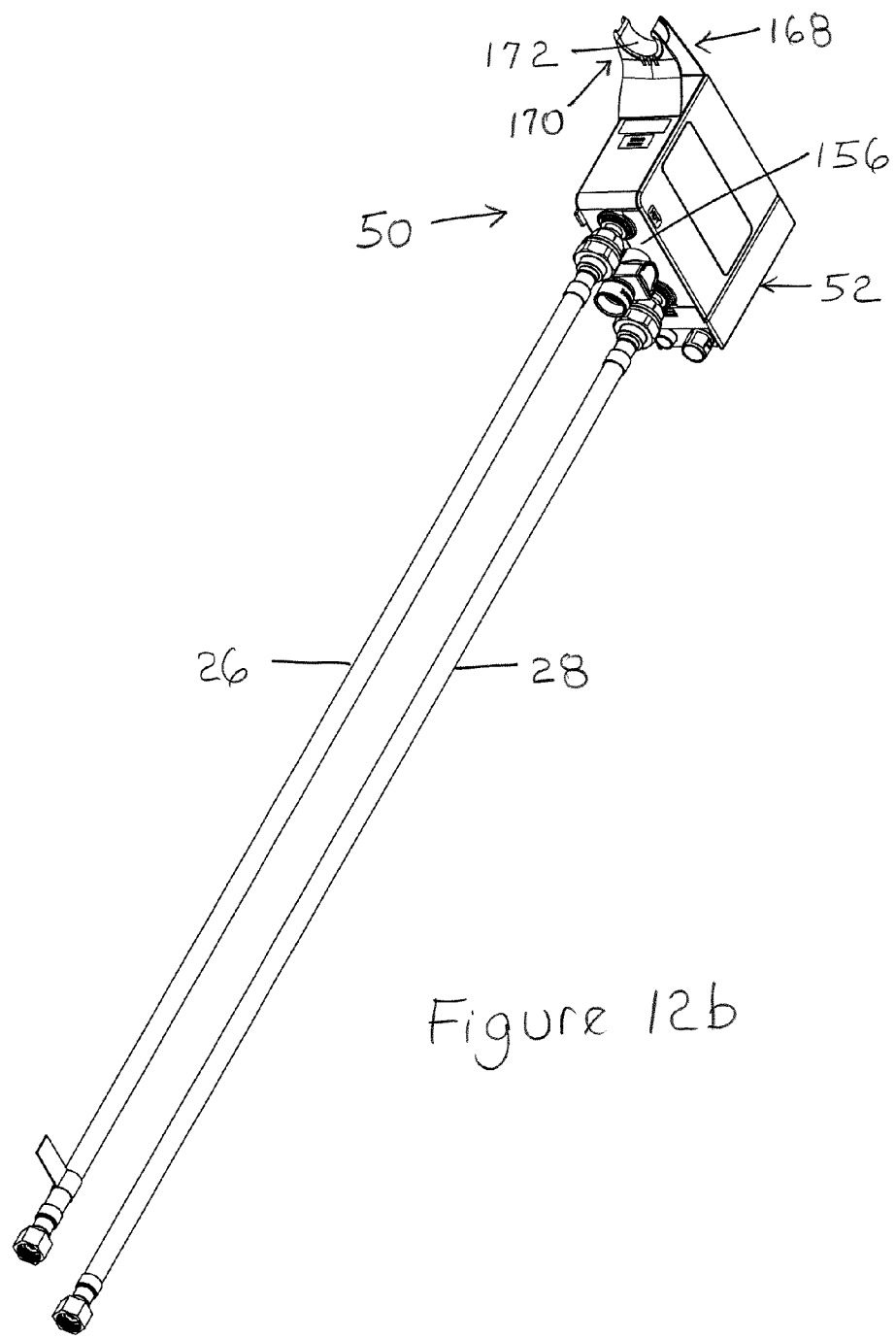
Figure 12C:
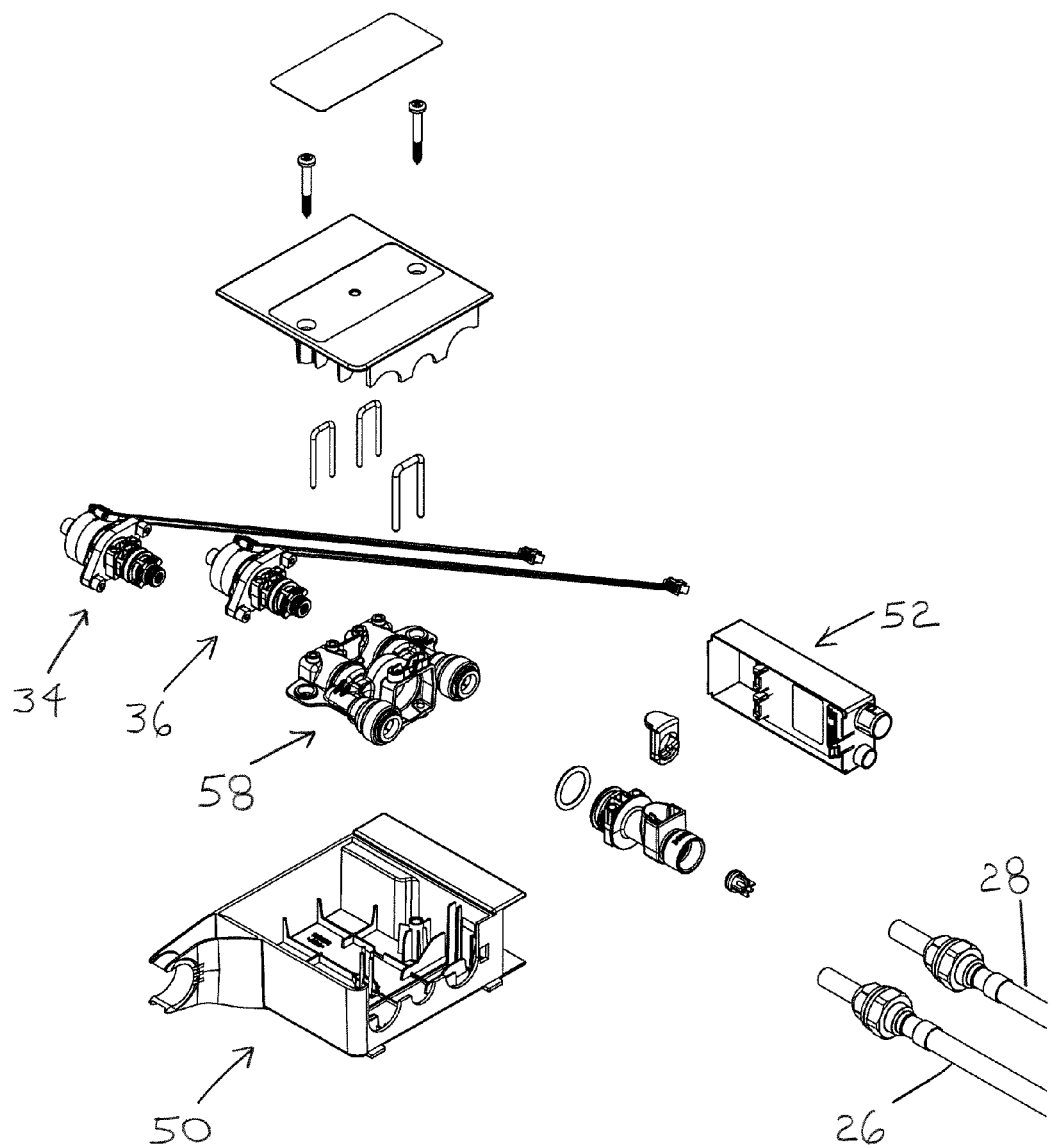
Figure 13A:
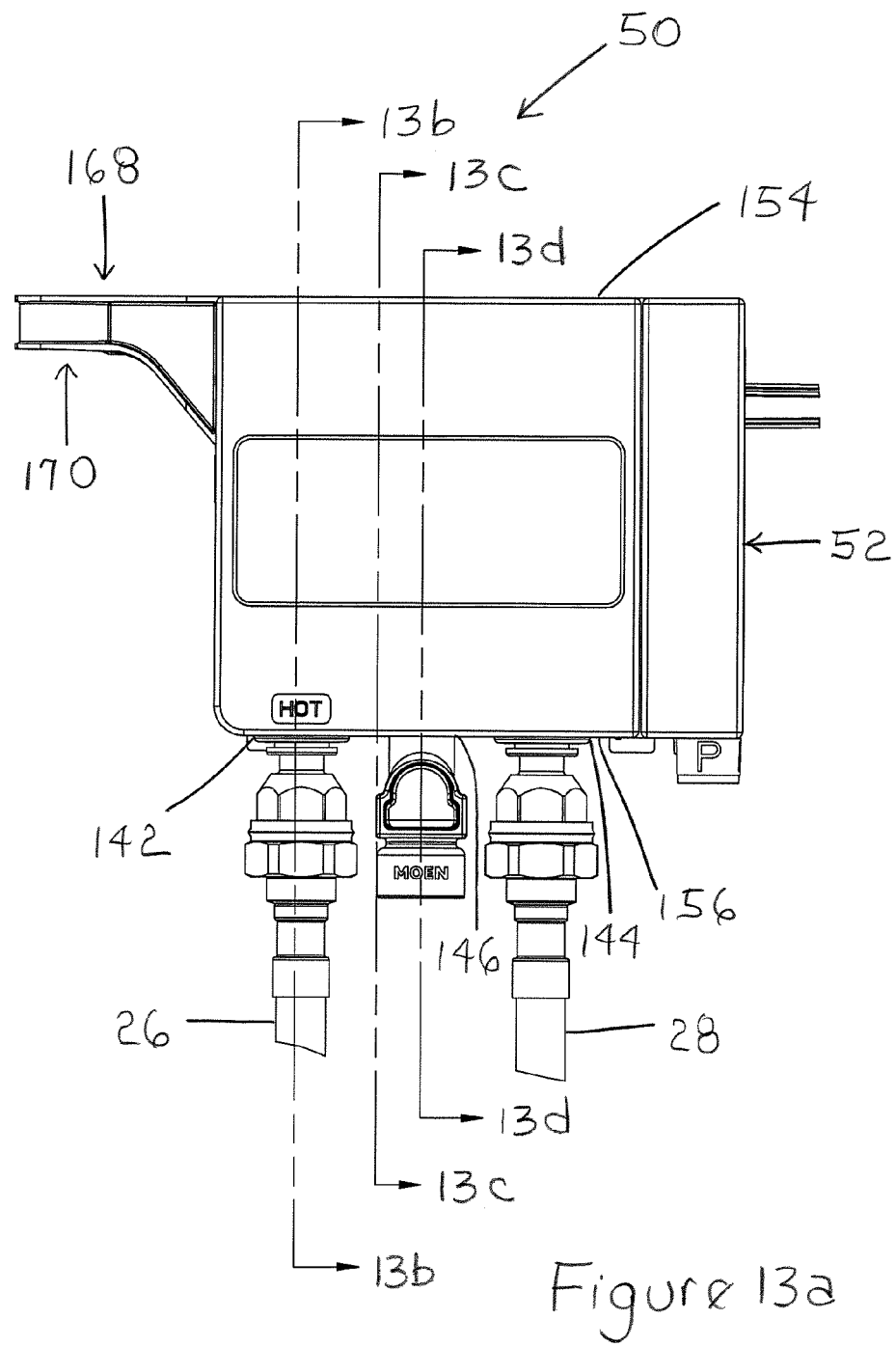
FIGS. 13a-13d include additional views of the flow module of FIGS. 12a-12c
Figure 13B:
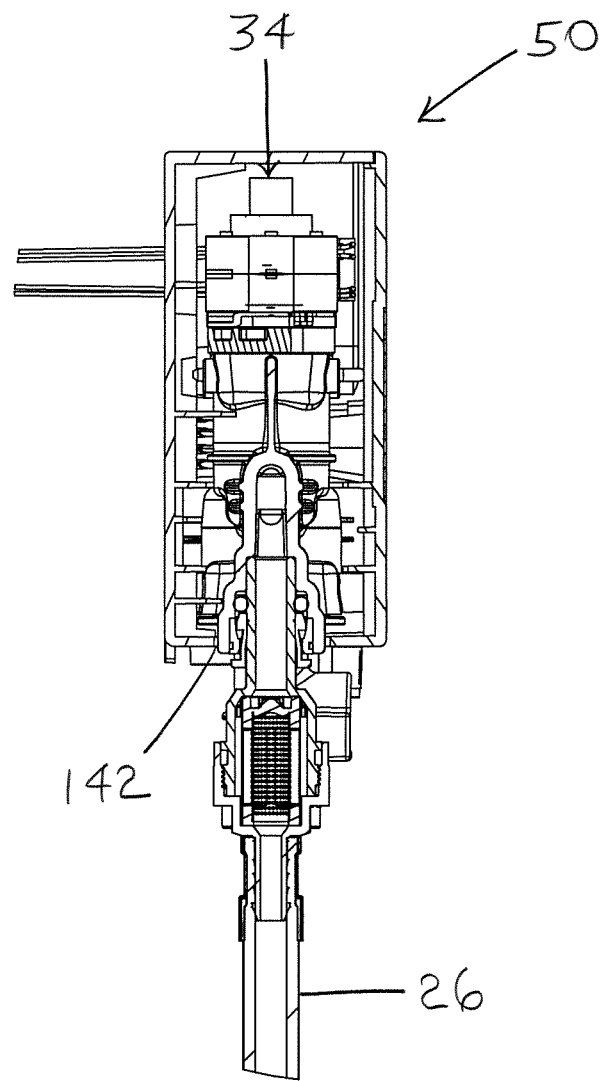
Figure 13C:
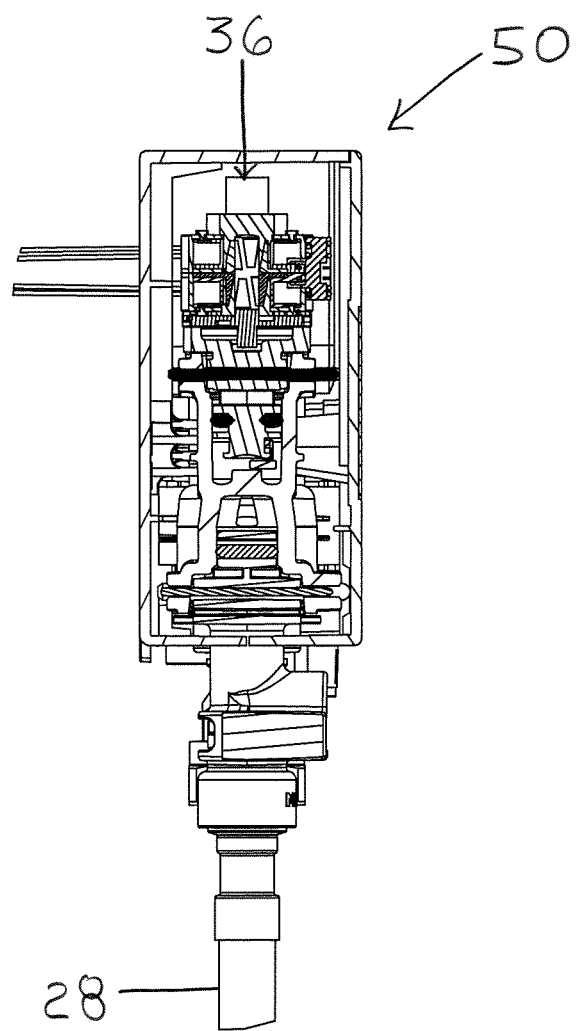
Figure 13D:
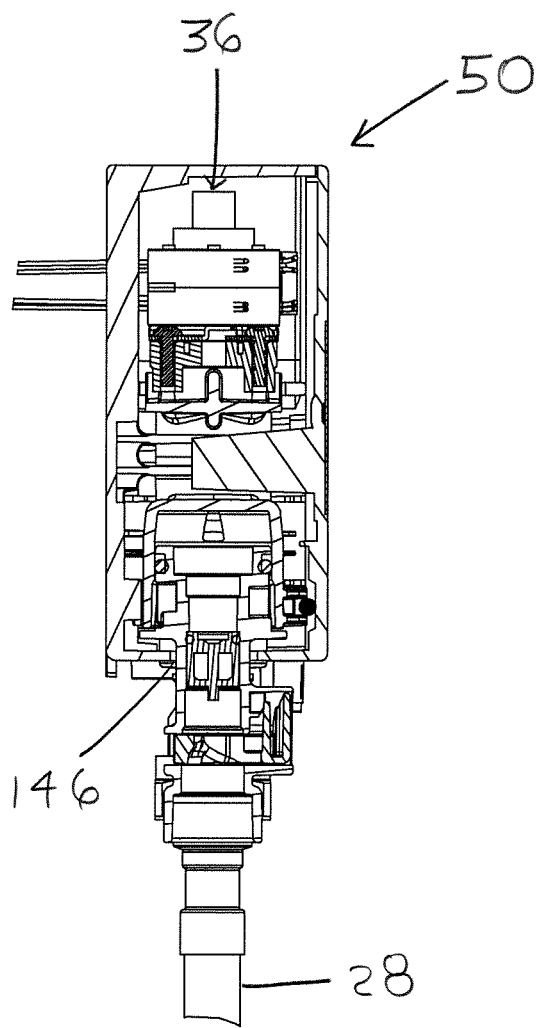
Figure 14A:
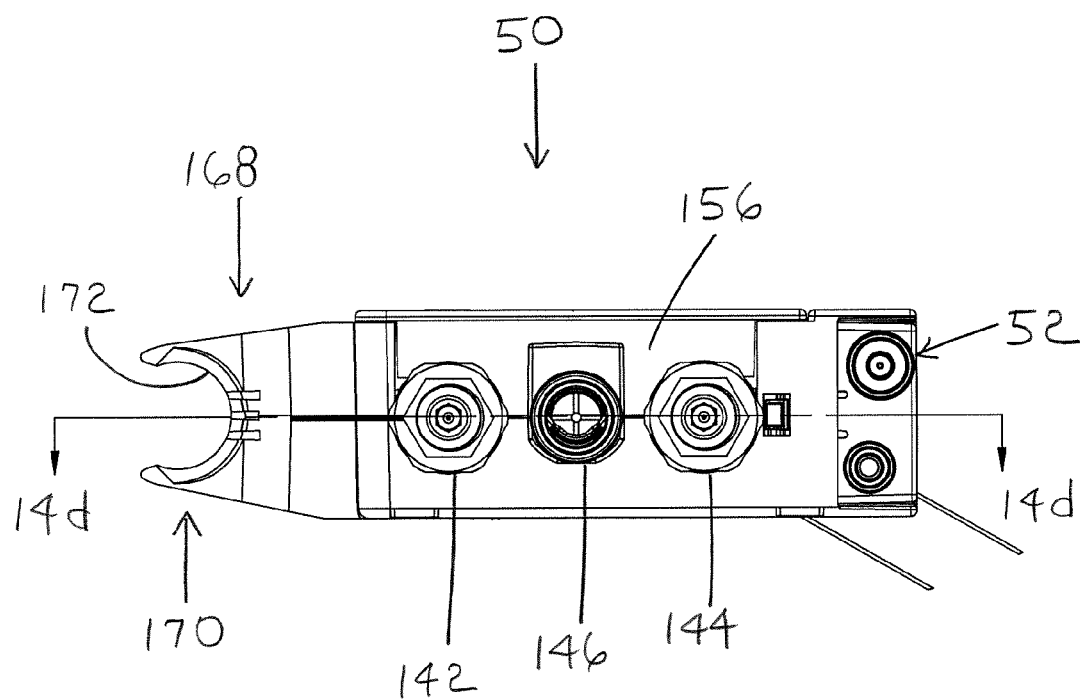
FIGS. 14a-14d include further views of the flow module of FIGS. 12a-12c
Figure 14C:
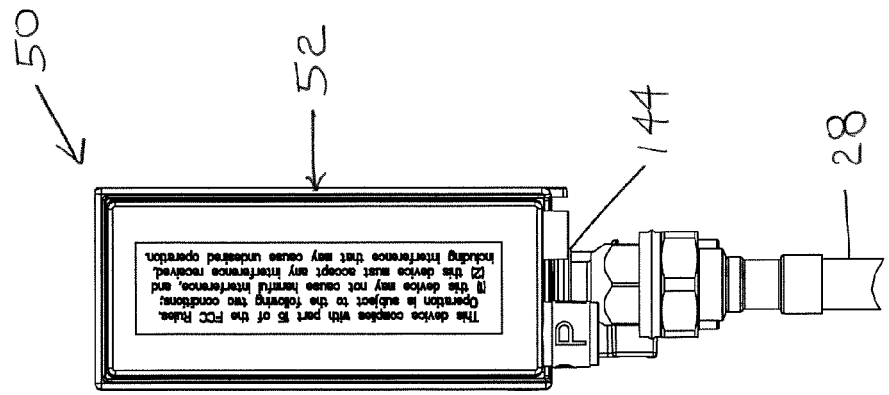
Figure 14B:
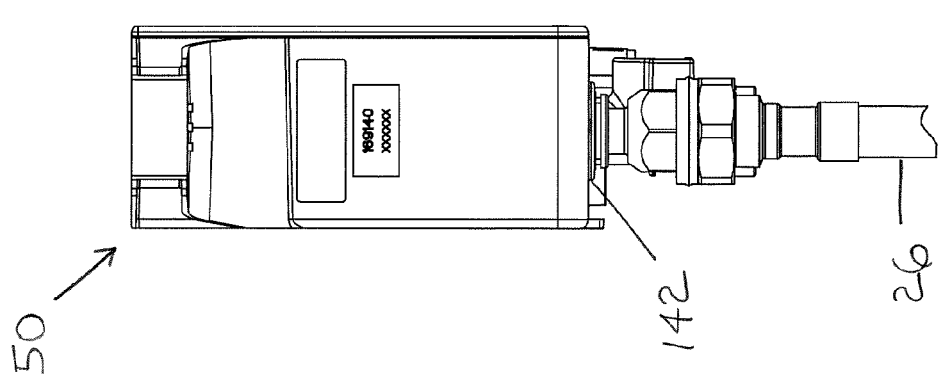
Figure 14D:
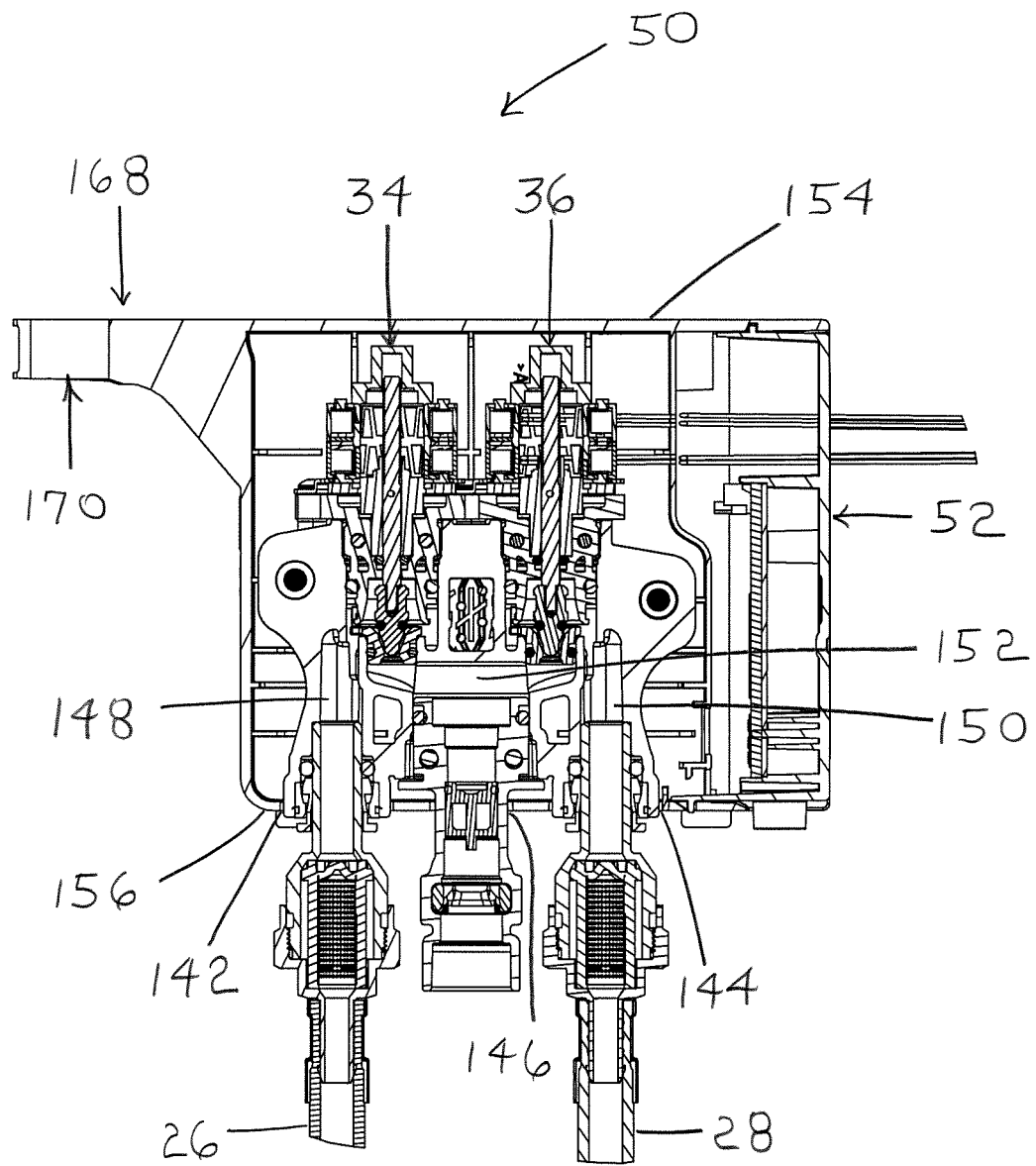

In the illustrated embodiment, as best shown in FIG. 2, the faucet 12 includes a hub 14, a spout 16, a flexible hose 18, a wand 20, and a handle 22. An upstream end of the hub 14 is connected to a mounting surface (such as a counter or sink). An upstream end of the spout 16 is connected to a downstream end of the hub 14. The spout 16 is operable to rotate relative to the hub 14. The flexible hose 18 extends through the hub 14 and the spout 16 and is operable to move within the hub 14 and the spout 16. An upstream end of the wand 20 is mounted in a downstream end of the spout 16 and is connected to a downstream end of the flexible hose 18. A downstream end of the wand 20 includes a discharge outlet 24 through which water is delivered from the faucet 12. The wand 20 is operable to be pulled away from the spout 16. The handle 22 covers a side opening in the hub 14 and is operable to be moved relative to the hub 14. Although the faucet 12 has been described as having a rotatable spout 16, a pull-out or pull-down wand 20, and a handle 22 mounted on the hub 14, one of ordinary skill in the art will appreciate that the spout 16 could be fixed relative to the hub 14, the faucet 12 may not include a wand 20, the handle 22 may be mounted on other locations on the faucet 12 or remote from the faucet 12, the faucet 12 could include more than one handle 22, the handle 22 may be any mechanical actuation device or user interface, and/or the faucet 12 may not include a handle 22.

Additionally, in the illustrated embodiment, as best shown in FIG. 1, the fitting 10 includes a hot water line 26, a cold water line 28, a mixed water line 30, and an electronic mixing valve 32. The electronic mixing valve 32 includes a hot water electronic valve 34 and a cold water electronic valve 36. An upstream end of the hot water line 26 connects to a hot water supply 38, and an upstream end of the cold water line 28 connects to a cold water supply 40. A downstream end of the hot water line 26 connects to the electronic mixing valve 32, and more specifically, the hot water electronic valve 34. A downstream end of the cold water line 28 connects to the electronic mixing valve 32 and, more specifically, the cold water electronic valve 36. An upstream end of the mixed water line 30 connects to the electronic mixing valve 32. A downstream end of the mixed water line 30 connects to the discharge outlet 24. In the illustrated embodiments, at least a portion of the mixed water line 30 is the flexible hose 18. As stated above, the downstream end of the flexible hose 18 connects to the upstream end of the wand 20. Although the faucet 12 has been described as including a hot water electronic valve 34 and a cold water electronic valve 36, one of ordinary skill in the art will appreciate that the faucet 12 could include one or more electronic valves and/or the faucet 12 could include one or more mechanical valves in series or in parallel with the electronic valve(s).

In an exemplary embodiment, the hot water electronic valve 34 and the cold water electronic valve 36 are proportional valves and, more specifically, stepper motor actuated valves. However, one of ordinary skill in the art will appreciate that, in some embodiments, the electronic valves could be any type of electronic valves.

Further, in the illustrated embodiments, as best shown in FIGS. 1 and 2, the fitting 10 includes an activation sensor 42, such as a toggle sensor 44 and a presence sensor 46 of the faucet 12.

In an exemplary embodiment, the toggle sensor 44 is a proximity sensor and, in particular, an infrared sensor. The toggle sensor 44 is also referred to as a latching sensor and a sustained-flow sensor. In the illustrated embodiment, the toggle sensor 44 is mounted on an apex of the spout 16. The toggle sensor 44 defines a toggle zone. In an exemplary embodiment, the toggle sensor 44 is operable to activate the hot water electronic valve 34 and the cold water electronic valve 36 when an object enters the toggle zone and to deactivate the hot water electronic valve 34 and the cold water electronic valve 36 when the object exits and reenters the toggle zone. As used herein, an "object" can be any portion of a user's body or any item used by the user to trigger the toggle sensor 44. In an exemplary embodiment, the toggle zone extends generally upwardly from the toggle sensor 44. Additionally, in an exemplary embodiment, the toggle zone has a generally cone-like shape.

In an exemplary embodiment, the presence sensor 46 is a proximity sensor, and, in particular, an infrared sensor. The presence sensor 46 is also referred to as a quick-strike sensor. In the illustrated embodiment, the presence sensor 46 is mounted on the upstream end of the spout 16. The presence sensor 46 defines a presence zone. In an exemplary embodiment, the presence sensor 46 is operable to activate the hot water electronic valve 34 and the cold water electronic valve 36 when an object enters the presence zone and to deactivate the hot water electronic valve 34 and the cold water electronic valve 36 when the object exits the presence zone. Again, as used herein, an "object" can be any portion of a user's body or any item used by the user to trigger the presence sensor 46. In an exemplary embodiment, the presence zone extends generally horizontally from the presence sensor 46. Additionally, in an exemplary embodiment, the presence zone has a generally cone-like shape.

As described above, the toggle sensor 44 and the presence sensor 46 are proximity sensors and, in particular, infrared sensors. Proximity sensors are sensors that detect the presence of an object without any physical contact. However, one of ordinary skill in the art will appreciate that the toggle sensor 44 and the presence sensor 46 could be any type of electronic sensors that can be triggered, including, but not limited to, other proximity sensors, touch sensors, and image sensors. Exemplary electronic sensors include, but are not limited to, electromagnetic radiation sensors (such as optical sensors and radar sensors), capacitance sensors, inductance sensors, piezo-electric sensors, and multi-pixel optical sensors (such as camera sensors). Moreover, the toggle sensor 44 and the presence sensor 46 may not be the same type of sensor. As further described above, the toggle sensor 44 is mounted on the apex of the spout 16 and the presence sensor 46 is mounted on the upstream end of the spout 16. However, one of ordinary skill in the art will appreciate that the toggle sensor 44 and the presence sensor 46 could be mounted in any location on the faucet 12 or in a location remote from the faucet 12. Furthermore, the toggle sensor 44 and the presence sensor 46 may be located in close proximity to each other or fairly remote from each other.

Similarly, as described above, the sensors are a toggle sensor 44 and a presence sensor 46. However, one of ordinary skill in the art will appreciate that the toggle sensor 44 and the presence sensor 46 could be any type of sensors that provide information useful in determining whether to activate or deactivate the hot water electronic valve 34 and the cold water electronic valve 36, including, but not limited to, flow sensors, pressure sensors, temperature sensors, and position sensors. Moreover, the toggle sensor 44 and the presence sensor 46 may be the same type of sensor.

Further, in the illustrated embodiment, as best shown in FIG. 1, the fitting 10 includes a parameter sensor 48. In an exemplary embodiment, the parameter sensor 48 is operable to detect movement of the handle 22 and to provide information to set at least one parameter of water flowing through the hot water electronic valve 34 and the cold water electronic valve 36 based on the movement of the handle 22. The parameter sensor 48 is operable to detect movement of the handle 22 either directly or indirectly. In an exemplary embodiment, based on the movement of the handle 22, the parameter sensor 48 provides information to set a temperature and/or a volume of water flowing through the hot water electronic valve 34 and the cold water electronic valve 36.

In the illustrated embodiments, the handle 22 operates as it would with a standard faucet. In other words, the handle 22 can be moved between various positions to indicate a desired temperature and volume of water discharged from the faucet 12.

More specifically, with regard to the temperature of water, the handle 22 can be rotated about a longitudinal axis of the side opening in the hub 14. At one extent of a range of rotation, the position of the handle 22 indicates all hot water (a full hot position). At the other extent of the range of rotation, the position of the handle 22 indicates all cold water (a full cold position). In between the extents of the range of rotation, the position of the handle 22 indicates a mix of hot and cold water (mixed temperature positions) with hotter temperature water as the position nears the full hot extent of the range of rotation and colder temperature water as the position nears the full cold extent of the range of rotation.

With regard to the volume of water, the handle 22 can be moved toward and away from the side opening in the hub 14. At one extent of a range of movement, the position of the handle 22 indicates no volume of water (a full closed position). At the other extent of the range of movement, the position of the handle 22 indicates full volume of water (a full open position). In between the extents of the range of movement, the position of the handle 22 indicates an intermediate volume of water (less than full open positions) with reduced volume water as the position nears the full closed extent of the range of movement and increased volume water as the position nears the full open extent of the range of movement.

Additionally, in the illustrated embodiment, as best shown in FIG. 2, the electronic faucet 12 includes a flow module 50, an electronics module 52, and a power module 54. The flow module 50 includes a number of inlets and outlets and a number of flow passages. These inlets/outlets and flow passages enable the easy management of the flow between the incoming supplies (i.e., the hot water supply 38 and the cold water supply 40) and the wand 20. In the illustrated embodiment, the hot water electronic valve 34 and the cold water electronic valve 36 are located inside the flow module 50. The electronics module 52 includes a number of electronic components. These components enable the activation and deactivation of the hot water electronic valve 34 and the cold water electronic valve 36. In the illustrated embodiment, the electronics module 52 is connected to the flow module 50. The power module 54 provides electrical power to electronic components of the faucet 12.

Further, in the illustrated embodiment, as best shown in FIG. 1, the fitting 10 includes an electronic control 56. The electronic control 56 receives information (such as signals) from the toggle sensor 44 and the presence sensor 46 to activate and deactivate the hot water electronic valve 34 and the cold water electronic valve 36. Moreover, the electronic control 56 receives information (such as signals) from the parameter sensor 48 to set parameters (such as the temperature and the volume) of water flowing through the hot water electronic valve 34 and the cold water electronic valve 36. In an exemplary embodiment, at least a portion of the electronic control 56 is located inside the electronics module 52. Although the fitting 10 has been described as having a separate electronic control 56, one of ordinary skill in the art will appreciate that the electronic control 56 could be incorporated into the toggle sensor 44, the presence sensor 46, and/or the parameter sensor 48.

In an exemplary embodiment, as best shown in FIGS. 3a-3b and 5a-5g, the electronic mixing valve 32 includes the hot water electronic valve 34, the cold water electronic valve 36, and a housing 58. The housing 58 includes a hot water inlet 60, a cold water inlet 62, a hot water electronic valve chamber 64, a cold water electronic valve chamber 66, a mixing chamber 68, and an outlet 70. The hot water electronic valve 34 is operable to be received in the hot water electronic valve chamber 64, and the cold water electronic valve 36 is operable to be received in the cold water electronic valve chamber 66.

In an exemplary embodiment, the hot water electronic valve 34 and the cold water electronic valve 36 are the same type of valve, i.e., a proportional valve and, more specifically, a stepper motor actuated valve. The following description of the electronic valve applies to both the hot water electronic valve 34 and the cold water electronic valve 36.

In an exemplary embodiment, as best shown in FIGS. 3a-5g, the hot/cold water electronic valve 34/36 includes a stepper motor 72, an upper housing 74, a lower housing 76h/76c, a piston 78, a seat 80, and various sealing members 82, such as O-rings. The motor 72 includes a shaft 84.

In an exemplary embodiment, as best shown in FIGS. 5a-5g, the lower housing 76h/76c of the hot/cold water electronic valve 34/36 is integral with the housing 58 of the electronic mixing valve 32. However, one of ordinary skill in the art will appreciate that the lower housing 76h/76c of the hot/cold water electronic valve 34/36 could be separate from the housing 58 of the electronic mixing valve 32.

In an exemplary embodiment, as best shown in FIGS. 6a-6e, the piston 78 includes a body 86 and a nose 88. In the illustrated embodiment, the body 86 is generally cylindrical shaped. More specifically, the body 86 is a hexagonal prism. The body 86 includes a recess 90 that is operable to receive a portion of the shaft 84. In the illustrated embodiment, the nose 88 includes a sealing member groove 92, a first conical portion 94, a cylindrical portion 96, and a second conical portion 98. The sealing member groove 92 is operable to receive the sealing member 82, such as an O-ring. Although the nose 88 of the piston 78 has been described as including specific portions, one of ordinary skill in the art will appreciate that the nose 88 of the piston 78 does not need to include each of these portions. For example, the nose 88 of the piston 78 may not include a second conical portion 98.

In an exemplary embodiment, as best shown in FIGS. 7a-7e, the seat 80 includes a body 100 and a plurality of projections 102 extending therefrom. In the illustrated embodiment, the body 100 is generally cylindrical shaped. In the illustrated embodiment, the seat 80 includes four projections 102 extending from the body 100. The projections 102 are operable to connect the seat 80 to the lower housing 76h/76c. The body 100 includes a central opening 104 extending therethrough. In the illustrated embodiment, the central opening 104 in the body 100 includes an inlet portion 106, a first cylindrical portion 108, a conical portion 110, a second cylindrical portion 112, and an outlet portion 114. The nose 88 of the piston 78 is operable to be received in and move in and out of the central opening 104 in the seat 80. Although the central opening 104 in the seat 80 has been described as including specific portions, one of ordinary skill in the art will appreciate that the central opening 104 in the seat 80 does not need to include each of these portions. For example, the central opening 104 in the seat 80 may not include a first cylindrical portion 112 and an outlet portion 114.

During operation of the hot/cold water electronic valve 34/36 including the piston 78 and the seat 80, as best shown in FIGS. 8a-8e, the hot/cold water electronic valve 34/36 moves from a completely closed position to a completely open position. In the completely closed position, no fluid flows through the hot/cold water electronic valve 34/36. In the completely open position, a maximum amount of fluid flows through the hot/cold water electronic valve 34/36. Between the completely closed position and the completely open position, an increasing amount of fluid flows through the hot/cold water electronic valve 34/36.

In the completely closed position, the sealing member 82 on the piston 78 is in sealing contact with the inlet portion 106 of the seat 80. Additionally, the first conical portion 94 and the cylindrical portion 96 of the piston 78 interface with the conical portion 110 and the second cylindrical portion 112 of the seat 80. As a result of the sealing contact between the sealing member 82 on the piston 78 and the inlet portion 106 of the seat 80, no fluid flows through the hot/cold water electronic valve 34/36.

As the piston 78 starts to move out of the seat 80, the sealing member 82 on the piston 78 loses sealing contact with the inlet portion 106 of the seat 80. Additionally, the first conical portion 94 and the cylindrical portion 96 of the piston 78 move away from the conical portion 110 and the second cylindrical portion 112 of the seat 80. As a result of the sealing member 82 on the piston 78 losing sealing contact with the inlet portion 106 of the seat 80, fluid starts to flow through the hot/cold water electronic valve 34/36.

As the piston 78 moves further out of the seat 80, the sealing member 82 on the piston 78 moves further away from the inlet portion 106 of the seat 80. Additionally, the first conical portion 94 and the cylindrical portion 96 of the piston 78 move further away from the conical portion 110 and the second cylindrical portion 112 of the seat 80. As a result, an increasing amount of fluid flows through the hot/cold water electronic valve 34/36.

In the completely open position, the sealing member 82 on the piston 78 is furthest away from the inlet portion 106 of the seat 80. Additionally, the first conical portion 94 and the cylindrical portion 96 of the piston 78 are furthest away from the conical portion 110 and the second cylindrical portion 112 of the seat 80. As a result, the maximum amount of fluid flows through the hot/cold water electronic valve 34/36.

Although the hot/cold water electronic valve 34/36 has been described with the sealing member 82 on the piston 78 interfacing with the inlet portion 106 of the seat 80, one of ordinary skill in the art will appreciate that the sealing member 82 could be on the seat 80 and interface with the nose 88 of the piston 78. Additionally, although the hot/cold water electronic valve 34/36 has been described as including a sealing member 82, such as an O-ring, in the sealing member groove 92 on the piston 78, one of ordinary skill in the art will appreciate that the sealing member 82 could be integrally formed with the piston 78 (or the seat 80 if the sealing member 82 is on the seat 80). Further, one of ordinary skill in the art will appreciate that the piston 78 (or the seat 80 if the sealing member 82 is on the seat 80) does not need to include a sealing member groove 92.

In another exemplary embodiment, as best shown in FIGS. 9a-9d, the piston 78' includes a body 86' and a nose 88'. In the illustrated embodiment, the body 86' is generally cylindrical shaped. More specifically, the body 86' is a hexagonal prism. The body 86' includes a recess 90' that is operable to receive a portion of the shaft 84. In the illustrated embodiment, the nose 88' includes a sealing member groove 92' and a dome-shaped portion 122. The sealing member groove 92' is operable to receive the sealing member 82, such as an O-ring.

In another exemplary embodiment, as best shown in FIGS. 10a-10d, the seat 80' includes a body 100' and a plurality of projections 102' extending therefrom. In the illustrated embodiment, the body 100' is generally cylindrical shaped. In the illustrated embodiment, the seat 80' includes four projections 102' extending from the body 100'. The projections 102' are operable to connect the seat 80' to the lower housing 76h/76c. The body 100' includes a central opening 104' extending therethrough. In the illustrated embodiment, the central opening 104' in the body 100' includes an inlet portion 106', a rounded portion 124, and an outlet portion 114'. The nose 88' of the piston 78' is operable to be received in and move in and out of the central opening 104' in the seat 80'. Although the central opening 104' in the seat 80' has been described as including specific portions, one of ordinary skill in the art will appreciate that the central opening 104' in the seat 80' does not need to include each of these portions. For example, the central opening 104' in the seat 80' may not include an outlet portion 114'.

During operation of the hot/cold water electronic valve 34/36 including the piston 78' and the seat 80', as best shown in FIGS. 11a-11e, the hot/cold water electronic valve 34/36 moves from a completely closed position to a completely open position. In the completely closed position, no fluid flows through the hot/cold water electronic valve 34/36. In the completely open position, a maximum amount of fluid flows through the hot/cold water electronic valve 34/36. Between the completely closed position and the completely open position, an increasing amount of fluid flows through the hot/cold water electronic valve 34/36.

In the completely closed position, the sealing member 82 on the piston 78' is in sealing contact with the inlet portion 106' of the seat 80'. Additionally, the dome-shaped portion 122 of the piston 78' interfaces with the rounded portion 124 of the seat 80'. As a result of the sealing contact between the sealing member 82 on the piston 78' and the inlet portion 106' of the seat 80', no fluid flows through the hot/cold water electronic valve 34/36.

As the piston 78' starts to move out of the seat 80', the sealing member 82 on the piston 78' loses sealing contact with the inlet portion 106' of the seat 80'. Additionally, the dome-shaped portion 122 of the piston 78' moves along the rounded portion 124 of the seat 80'. As a result of the sealing member 82 on the piston 78' losing sealing contact with the inlet portion 106' of the seat 80', fluid starts to flow through the hot/cold water electronic valve 34/36.

As the piston 78' moves further out of the seat 80', the sealing member 82 on the piston 78' moves further away from the inlet portion 106' of the seat 80'. Additionally, the dome-shaped portion 122 of the piston 78' moves further away from the rounded portion 124 of the seat 80'. As a result, an increasing amount of fluid flows through the hot/cold water electronic valve 34/36.

In the completely open position, the sealing member 82 on the piston 78' is furthest away from the inlet portion 106' of the seat 80'. Additionally, the dome-shaped portion 122 of the piston 78' is furthest away from the rounded portion 124 of the seat 80'. As a result, the maximum amount of fluid flows through the hot/cold water electronic valve 34/36.

Although the hot/cold water electronic valve 34/36 has been described with the sealing member 82 on the piston 78' interfacing with the inlet portion 106' of the seat 80', one of ordinary skill in the art will appreciate that the sealing member 82 could be on the seat 80' and interface with the nose 88' of the piston 78'. Additionally, although the hot/cold water electronic valve 34/36 has been described as including a sealing member 82, such as an O-ring, in the sealing member groove 92' on the piston 78', one of ordinary skill in the art will appreciate that the sealing member 82 could be integrally formed with the piston 78' (or the seat 80' if the sealing member 82 is on the seat 80'). Further, one of ordinary skill in the art will appreciate that the piston 78' (or the seat 80' if the sealing member 82 is on the seat 80') does not need to include a sealing member groove 92'.

Although the electronic plumbing fixture fitting 10 has been described as including an electronic mixing valve 32 and the electronic mixing valve 32 has been described as including a hot water electronic valve 34 and a cold water electronic valve 36, one of ordinary skill in the art will appreciate that the electronic valve could be used as a shutoff valve in addition to or in place of the mixing valve. Additionally, when the electronic valve is used as a shutoff valve, the seat 80/80' could be integrated into the valve housing.

As stated above, the flow module 50 includes a number of inlets and outlets and a number of flow passages. These inlets/outlets and flow passages enable the easy management of the flow between the incoming supplies (i.e., the hot water supply 38 and the cold water supply 40) and the wand 20. In the illustrated embodiment, the electronic mixing valve 32, including the hot water electronic valve 34, the cold water electronic valve 36, and the housing 58, is located inside the flow module 50.

In an exemplary embodiment, as best shown in FIGS. 12a-14d, the flow module 50 includes the following inlets:

1. a hot water inlet 142 operable to receive hot water from the hot water supply 38—in the illustrated embodiment, the hot water inlet 142 of the flow module 50 includes the hot water inlet 60 of the housing 58—as illustrated, the hot water inlet 142 fluidly connects to the hot water line 26, and 2. a cold water inlet 144 operable to receive cold water from the cold water supply 40—in the illustrated embodiment, the cold water inlet 144 of the flow module 50 includes the cold water inlet 62 of the housing 58—as illustrated, the cold water inlet 144 fluidly connects to the cold water line 28.

Additionally, the flow module 50 includes the following outlet:

1. a mixed water outlet 146 operable to discharge mixed water from the hot water electronic valve 34 and the cold water electronic valve 36 to the discharge outlet 24—in the illustrated embodiment, the mixed water outlet 146 of the flow module 50 includes the outlet 70 of the housing 58—as illustrated, the mixed water outlet 146 fluidly connects to the mixed water line 30 (also referred to as the flexible or wand hose 18).

Further, the flow module 50 includes the following flow passages:

1. a hot water passage 148 operable to fluidly connect the hot water inlet 142 and the hot water electronic valve 134, 2. a cold water passage 150 operable to fluidly connect the cold water inlet 144 and the cold water electronic valve 136, and 3. a mixed water passage 152 operable to fluidly connect the hot water electronic valve 134, the cold water electronic valve 136, and the mixed water outlet 146.

In the illustrated embodiment, the flow module 50 includes a top side 154 and a bottom side 156. The top side 154 is opposite the bottom side 156.

In the illustrated embodiment, the hot water inlet 142, the cold water inlet 144, and the mixed water outlet 146 are located in the bottom side 156 of the flow module 50.

In an exemplary embodiment, as best shown in FIG. 15, the electronic faucet 12 includes a mounting shank 158. The mounting shank 158 extends downwardly from the hub 14. The mounting shank 158 extends through and below the mounting surface (such as the counter or sink). Additionally, the mounting shank 158 extends behind the sink. In the illustrated embodiment, the mounting shank 158 has a hollow interior 160. In the illustrated embodiment, the mounting shank 158 has a threaded exterior 162. In the illustrated embodiment, the mounting shank has an inlet 164 and an outlet 166. In the illustrated embodiment, the outlet 166 of the mounting shank extends into the hub 14. Although the mounting shank 158 has been illustrated as having a hollow interior 160, one of ordinary skill in the art will appreciate that the mounting shank 158 could be solid. Additionally, although the mounting shank 158 has been illustrated as having a threaded exterior 162, one of ordinary skill in the art will appreciate that the mounting shank 158 could have a non-threaded exterior, such as a smooth exterior.

In an exemplary embodiment, the flow module 50 includes a bracket 168 extending therefrom. In the illustrated embodiment, the bracket 168 extends from the top side 154 of the flow module 50. In an exemplary embodiment, the bracket 168 includes a mounting portion 170. The mounting portion 170 is operable to connect to the mounting shank 158. In the illustrated embodiment, the mounting portion 170 includes a generally C-shaped clip 172 that enables the mounting portion 170 to connect to the mounting shank 158. In the illustrated embodiment, a nut 174 is operable to thread onto the mounting shank 158 and secure the generally C-shaped clip 172 to the mounting shank 158. Although the mounting portion 170 has been illustrated as including a generally C-shaped clip 172, one of ordinary skill in the art will appreciate that the mounting portion 170 could include any structure that enables the mounting portion 170 to connect to the mounting shank 158. For example, the mounting portion 170 could include a smooth bore that enables the mounting portion 170 to connect to the mounting shank 158 or a threaded bore that enables the mounting portion 170 to thread onto the mounting shank 158. Additionally, although the electronic faucet 12 has been illustrated as including a nut 174, one of ordinary skill in the art will appreciate that any type of fastener could be used to secure the mounting portion 170 to the mounting shank 158 or a separate fastener may not be needed to secure the mounting portion 170 to the mounting shank 158.

Figure 16A:
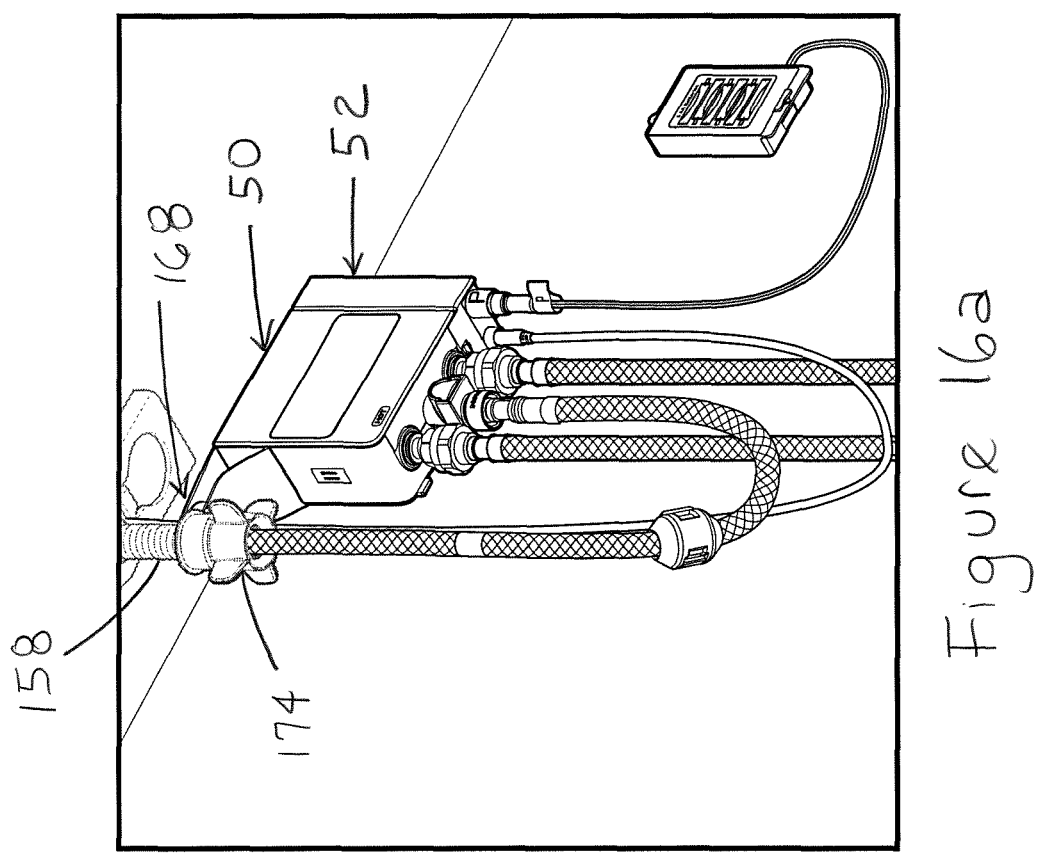
FIGS. 16a and 16b include views of the flow module of FIGS. 12a-14d mounted on the mounting shank of FIG. 15
Figure 16B:
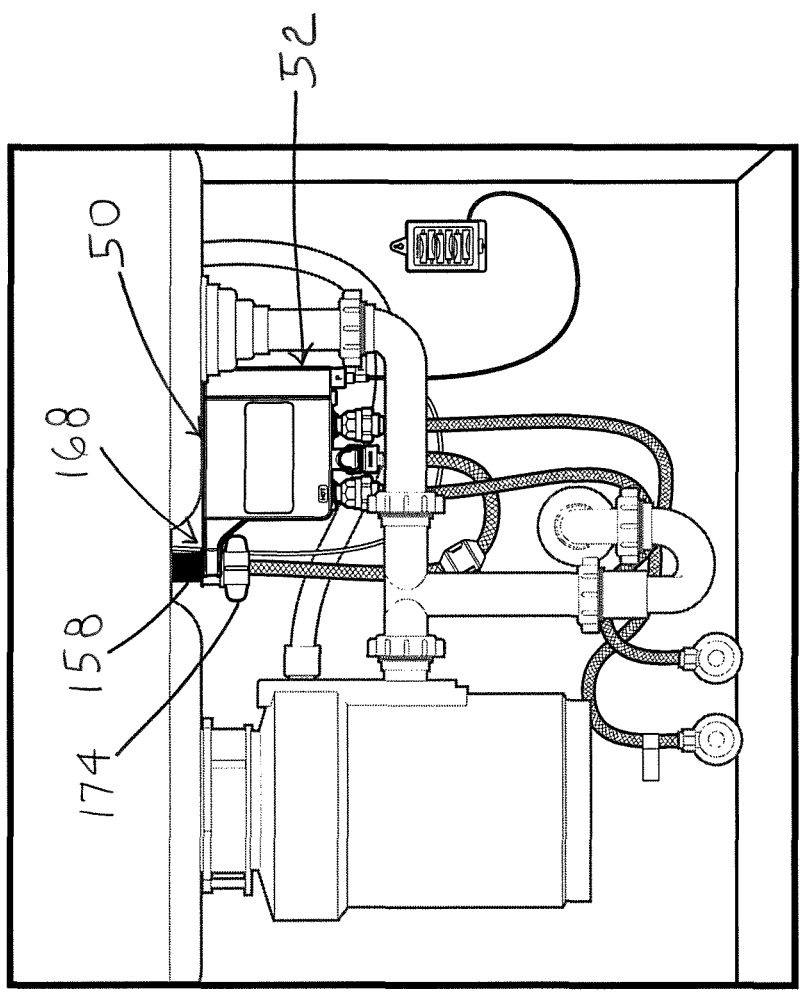

In an exemplary embodiment, as best shown in FIGS. 16a and 16b, the flow module 50 is operable to mount below the mounting surface (such as the counter or sink (and more specifically, a top of the sink)). In an exemplary embodiment, the flow module 50 is operable to mount at least partially behind the sink. In an exemplary embodiment, the flow module 50 is operable to mount substantially behind the sink. In an exemplary embodiment, at least thirty percent (30%) of the flow module 50 is operable to mount behind the sink. In an exemplary embodiment, the flow module 50 is operable to mount completely behind the sink. As a result, the flow module 50 can be mounted away from other items under the mounting surface and/or utilize space under the mounting surface that would otherwise not be utilized.

As used herein, "behind the sink" means a location behind a vertical plane that extends along a rear wall of the sink, regardless of whether the location is above or below a bottom wall of the sink. Walls of the sink and locations relative to walls of the sink are defined relative to a user of the sink when the user is standing at the sink operating the electronic faucet 12 in a normal mode of operation. In the normal mode of operation, (1) a front wall is a wall of the sink closest to the user, (2) the rear wall is a wall of the sink furthest from the user, (3) side walls are two (2) walls of the sink joining the front wall to the rear wall, (4) the bottom wall is a wall of the sink joining bottom edges of the front wall, the rear wall, and the side walls, and (5) the location behind the vertical plane that extends along the rear wall of the sink is a location on a side of the vertical plane that is furthest from the user.

In an exemplary embodiment, the bracket 168 positions the wand hose 18 between the mixed water outlet 146 and the inlet 164 of the mounting shank 158 such that a portion of the wand hose 18 extends in a loop between the hose bracket 168 and the inlet 164 of the mounting shank 158. As a result, the bracket 168 ensures that the wand hose 18 is properly aligned relative to the hub 14 and the spout 16 through which the wand hose 18 extends and moves. When the wand hose 18 is properly aligned relative to the hub 14 and the spout 16, the wand 20 can be easily pulled away from and returned to the spout 16.

One of ordinary skill in the art will now appreciate that the present invention provides an electronic plumbing fixture fitting with a flow module, such as an electronic faucet with a flow module. Although the present invention has been shown and described with reference to particular embodiments, equivalent alterations and modifications will occur to those skilled in the art upon reading and understanding this specification. The present invention includes all such equivalent alterations and modifications and is limited only by the scope of the following claims in light of their full scope of equivalents.

What is claimed is:

1. An electronic plumbing fixture fitting, comprising:
 a housing, the housing being operable to mount above a mounting surface, the housing including a spout and a wand, the wand being operable to pull away from the spout, the wand including a discharge outlet operable to deliver water;
 a mounting shank, the mounting shank being operable to extend downwardly from the housing, the mounting shank being operable to extend through and below the mounting surface, the mounting shank being operable to extend behind a sink mounted in the mounting surface;
 an electronic valve, the electronic valve being operable to permit flow of water through the discharge outlet when the electronic valve is activated and to not permit flow of water through the discharge outlet when the electronic valve is deactivated;
 a flow module, the electronic valve being located inside the flow module, the flow module including:
  a bracket, the bracket including a mounting portion, the mounting portion being operable to connect to the mounting shank,
  a hot water inlet operable to receive hot water from a hot water supply,
  a hot water passage operable to fluidly connect the hot water inlet and the electronic valve,
  a cold water inlet operable to receive cold water from a cold water supply,
  a cold water passage operable to fluidly connect the cold water inlet and the electronic valve,
  a mixed water outlet operable to discharge mixed water to the discharge outlet, and
  a mixed water passage operable to fluidly connect the electronic valve and the mixed water outlet; and
 a wand hose, the wand hose being operable to fluidly connect the mixed water outlet and the wand, the wand hose extending below the mounting surface and through the mounting surface and the spout;
 wherein the flow module is operable to mount below the mounting surface and on the mounting shank.

2. The electronic plumbing fixture fitting of claim 1, wherein the flow module is operable to mount at least partially behind the sink.

3. The electronic plumbing fixture fitting of claim 1, wherein the flow module is operable to mount substantially behind the sink.

4. The electronic plumbing fixture fitting of claim 1, wherein at least thirty percent of the flow module is operable to mount behind the sink.

5. The electronic plumbing fixture fitting of claim 1, wherein the flow module is operable to mount completely behind the sink.

6. The electronic plumbing fixture fitting of claim 1, further including:
 a sensor, the sensor being operable to send a signal when the electronic valve is to be activated; and
 an electronics module, the electronics module being operable to receive the signal from the sensor when the electronic valve is to be activated and, in response, send a signal to the electronic valve to activate the electronic valve, the electronics module being operable to connect to the flow module.

7. An electronic plumbing fixture fitting, comprising:
 a housing, the housing being operable to mount above a mounting surface, the housing including a spout and a wand, the wand being operable to pull away from the spout, the wand including a discharge outlet operable to deliver water;
 a mounting shank, the mounting shank being operable to extend downwardly from the housing, the mounting shank being operable to extend through and below the mounting surface, the mounting shank being operable to extend behind a sink mounted in the mounting surface;
 an electronic valve, the electronic valve being operable to permit flow of water through the discharge outlet when the electronic valve is activated and to not permit flow of water through the discharge outlet when the electronic valve is deactivated;
 a flow module, the electronic valve being located inside the flow module, the flow module including:
  a bracket, the bracket including a mounting portion, the mounting portion being operable to connect to the mounting shank, the mounting portion including a generally C-shaped clip that is operable to connect to the mounting shank,
  a hot water inlet operable to receive hot water from a hot water supply,
  a hot water passage operable to fluidly connect the hot water inlet and the electronic valve,
  a cold water inlet operable to receive cold water from a cold water supply,
  a cold water passage operable to fluidly connect the cold water inlet and the electronic valve,
  a mixed water outlet operable to discharge mixed water to the discharge outlet, and
  a mixed water passage operable to fluidly connect the electronic valve and the mixed water outlet; and
 a wand hose, the wand hose being operable to fluidly connect the mixed water outlet and the wand, the wand hose extending below the mounting surface and through the mounting surface and the spout;
 wherein the flow module is operable to mount below the mounting surface and on the mounting shank.

8. The electronic plumbing fixture fitting of claim 7, wherein the flow module is operable to mount at least partially behind the sink.

9. The electronic plumbing fixture fitting of claim 7, wherein the flow module is operable to mount substantially behind the sink.

10. The electronic plumbing fixture fitting of claim 7, wherein at least thirty percent of the flow module is operable to mount behind the sink.

11. The electronic plumbing fixture fitting of claim 7, wherein the flow module is operable to mount completely behind the sink.

12. The electronic plumbing fixture fitting of claim 7, wherein:
the flow module includes a top side and a bottom side, the top side being opposite the bottom side;
the bracket extends from the top side of the flow module; and
the hot water inlet, the cold water inlet, and the mixed water outlet are located in the bottom side of the flow module.

13. The electronic plumbing fixture fitting of claim 7, further including:
a sensor, the sensor being operable to send a signal when the electronic valve is to be activated; and
an electronics module, the electronics module being operable to receive the signal from the sensor when the electronic valve is to be activated and, in response, send a signal to the electronic valve to activate the electronic valve, the electronics module being operable to connect to the flow module.

14. An electronic plumbing fixture fitting, comprising:
a housing, the housing being operable to mount above a mounting surface, the housing including a spout and a wand, the wand being operable to pull away from the spout, the wand including a discharge outlet operable to deliver water;
a mounting shank, the mounting shank being operable to extend downwardly from the housing, the mounting shank being operable to extend through and below the mounting surface, the mounting shank being operable to extend behind a sink mounted in the mounting surface;
an electronic valve, the electronic valve being operable to permit flow of water through the discharge outlet when the electronic valve is activated and to not permit flow of water through the discharge outlet when the electronic valve is deactivated;
a flow module, the electronic valve being located inside the flow module, the flow module including:
a top side and a bottom side, the top side being opposite the bottom side;
a bracket, the bracket extending from the top side of the flow module, the bracket including a mounting portion, the mounting portion being operable to connect to the mounting shank,
a hot water inlet operable to receive hot water from a hot water supply, the hot water inlet being located in the bottom side of the flow module,
a hot water passage operable to fluidly connect the hot water inlet and the electronic valve,
a cold water inlet operable to receive cold water from a cold water supply, the cold water inlet being located in the bottom side of the flow module,
a cold water passage operable to fluidly connect the cold water inlet and the electronic valve,
a mixed water outlet operable to discharge mixed water to the discharge outlet, the mixed water outlet being located in the bottom side of the flow module, and
a mixed water passage operable to fluidly connect the electronic valve and the mixed water outlet; and
a wand hose, the wand hose being operable to fluidly connect the mixed water outlet and the wand, the wand hose extending below the mounting surface and through the mounting surface and the spout;
wherein the flow module is operable to mount below the mounting surface and on the mounting shank.

15. The electronic plumbing fixture fitting of claim 14, wherein the flow module is operable to mount at least partially behind the sink.

16. The electronic plumbing fixture fitting of claim 14, wherein the flow module is operable to mount substantially behind the sink.

17. The electronic plumbing fixture fitting of claim 14, wherein at least thirty percent of the flow module is operable to mount behind the sink.

18. The electronic plumbing fixture fitting of claim 14, wherein the flow module is operable to mount completely behind the sink.

19. The electronic plumbing fixture fitting of claim 14, wherein the mounting portion of the bracket include a generally C-shaped clip that is operable to connect to the mounting shank.

20. The electronic plumbing fixture fitting of claim 14, further including:
a sensor, the sensor being operable to send a signal when the electronic valve is to be activated; and
an electronics module, the electronics module being operable to receive the signal from the sensor when the electronic valve is to be activated and, in response, send a signal to the electronic valve to activate the electronic valve, the electronics module being operable to connect to the flow module.

* * * * *